United States Patent
Zeng et al.

(10) Patent No.: US 11,263,149 B2
(45) Date of Patent: Mar. 1, 2022

(54) CACHE MANAGEMENT OF LOGICAL-PHYSICAL TRANSLATION METADATA

(71) Applicant: Marvell Asia Pte, Ltd., Singapore (SG)

(72) Inventors: Yu Zeng, Chengdu (CN); Shenghao Gao, Chengdu (CN)

(73) Assignee: Marvell Asia PTE, Ltd., Singapore (SG)

( * ) Notice: Subject to any disclaimer, the term of this patent is extended or adjusted under 35 U.S.C. 154(b) by 43 days.

(21) Appl. No.: 16/801,637

(22) Filed: Feb. 26, 2020

(65) Prior Publication Data
US 2020/0272577 A1    Aug. 27, 2020

Related U.S. Application Data

(60) Provisional application No. 62/810,871, filed on Feb. 26, 2019.

(51) Int. Cl.
*G06F 12/1018* (2016.01)
*G06F 12/0804* (2016.01)

(52) U.S. Cl.
CPC ...... *G06F 12/1018* (2013.01); *G06F 12/0804* (2013.01); *G06F 2212/608* (2013.01); *G06F 2212/657* (2013.01)

(58) Field of Classification Search
CPC ............ G06F 12/1018; G06F 12/0804; G06F 2212/608; G06F 2212/657; G06F 2212/1024; G06F 2212/282; G06F 2212/466; G06F 2212/7201; G06F 12/0246
See application file for complete search history.

(56) References Cited

U.S. PATENT DOCUMENTS

| | | | | |
|---|---|---|---|---|
| 5,491,806 | A * | 2/1996 | Horstmann | G06F 12/1027 711/207 |
| 9,003,159 | B2 * | 4/2015 | Deshkar | G06F 12/0873 711/202 |
| 10,013,307 | B1 * | 7/2018 | Song | G06F 3/0685 |
| 10,255,004 | B2 * | 4/2019 | Kang | G11C 29/52 |
| 2015/0347026 | A1 * | 12/2015 | Thomas | G06F 12/0246 711/103 |
| 2017/0024326 | A1 * | 1/2017 | Luo | G06F 12/123 |
| 2018/0275873 | A1 * | 9/2018 | Frid | G06F 12/0246 |
| 2019/0012099 | A1 * | 1/2019 | Mulani | G06F 3/0619 |

(Continued)

OTHER PUBLICATIONS

"International Search Report and Written Opinion", Application No. PCT/IB2020/051659, dated Aug. 31, 2020, 17 pages.

(Continued)

*Primary Examiner* — Sean D Rossiter

(57) ABSTRACT

The present disclosure describes aspects of cache management of logical-physical translation metadata. In some aspects, a cache (260) for logical-physical translation entries of a storage media system (114) is divided into a plurality of segments (264). An indexer (364) is configured to efficiently balance a distribution of the logical-physical translation entries (252) between the segments (252). A search engine (362) associated with the cache is configured to search respective cache segments (264) and a cache manager (160) may leverage masked search functionality of the search engine (362) to reduce the overhead of cache flush operations.

20 Claims, 12 Drawing Sheets

(56) References Cited

U.S. PATENT DOCUMENTS

2019/0042464 A1* 2/2019 Genshaft ............. G06F 12/0246
2019/0369685 A1* 12/2019 Chang ................... G11C 7/222
2020/0142744 A1* 5/2020 Tolstsikau ............. G06F 9/5016

OTHER PUBLICATIONS

"Invitation to Pay Additional Fees", PCT Application No. PCT/IB2020/051659, May 28, 2020, 11 pages.
"International Preliminary Report on Patentability", Application No. PCT/IB2020/051659, dated Aug. 25, 202, 13 pages.

* cited by examiner

CACHE MANAGEMENT OF LOGICAL-PHYSICAL TRANSLATION METADATA

CROSS REFERENCE TO RELATED APPLICATION

This present disclosure claims priority to U.S. Provisional Patent Application Ser. No. 62/810,871 filed Feb. 26, 2019, the disclosure of which is incorporated by reference herein in its entirety

BACKGROUND

Many computing and electronic devices include non-volatile memory (NVM) for storing software, applications, user data and/or the like. Additionally, most users stream data or access services with their devices, such as multimedia content or social media applications, over data networks from various locations or on the move. With users' ever-increasing demand for data and services, storage providers have scaled up capacity and performance of NVM devices to support the data access associated with these activities of users and other clients. Typically, a storage or memory component of a device (a storage drive) includes NVM media to which data of the device is written and read from. To do so, the device may issue data access requests to the drive, which in turn writes the data to or reads the data from the NVM media as specified by each request. Thus, the performance of the drive generally depends on the rate at which the storage drive can complete the data access requests (e.g., the latency of the data access requests).

Logical-physical translation metadata may be used to, inter alia, maintain associations between logical addresses and physical addresses of the storage drive. For example, NVM media of the drive may have "asymmetric" and/or "write once" characteristics. As used herein, "write once" NVM media refers to NVM media that must be reinitialized (e.g., erased) each time data is written and/or programmed thereon. As used herein, "asymmetric" NVM media refers to NVM media having significantly different latencies for different operations; for example, read operations may have much lower latency than write/program operations, which may have much lower latency than erase operations. To reduce the impact of these characteristics, asymmetric and/or write-once NVM media may be partitioned into divisions (e.g., erase blocks), each division comprising a plurality of pages capable of being erased as a group. Applying conventional approaches to storing data on these types of NVM media can result in highly-inefficient write amplification; modifying data of a logical address "in-place" (at the same physical address) may require erasing and rewriting an entire division of the NVM media, resulting in excessive wear and reduced performance. Some of these issues can be overcome through "out-of-place" update techniques, in which associations between logical and physical addresses are maintained in persistent storage, obviating the need to erase and reprogram entire storage divisions for each individual write. Data rendered obsolete by out-of-place updates (e.g., data that have been logically "overwritten" at some other physical address) may be removed from the NVM media in background garbage collection, grooming, and/or consolidation operations.

Logical-physical translation metadata may be retained in persistent storage (e.g., on the NVM media itself). Servicing data requests may, therefore, involve retrieving and/or updating logical-physical translations in persistent storage, which may increase request latency. For example, servicing a request to read data associated with a particular logical address may involve: a) retrieving a logical-to-physical mapping for the particular logical address from persistent storage, and b) reading data stored at the mapped physical address from the NVM media (e.g., may involve two NVM read operations). By way of further example, servicing a request to write data to the particular logical address may involve: a) writing the data at a selected physical address of the NVM media, and b) recording a logical-to-physical mapping associating the particular logical address with the selected physical address in persistent storage (e.g., two NVM write operations). Moreover, conventional cache techniques are inefficient, which can further impact I/O performance.

SUMMARY

This summary is provided to introduce subject matter that is further described in the Detailed Description and Drawings. Accordingly, this Summary should not be considered to describe essential features nor used to limit the scope of the claimed subject matter.

Aspects of the disclosure relate to the management of logical-physical translation metadata pertaining to NVM media. In some aspects, a translation layer maintains logical-physical translation metadata (FTL metadata) pertaining to NVM media, which may comprise, inter alia, entries configured to map logical addresses of a logical address space to physical addresses at which data corresponding to the logical addresses are stored on the NVM media. The FTL metadata may be retained in persistent, non-transitory, and/or non-volatile storage (e.g., on the NVM media).

Accessing logical-physical translation metadata from persistent storage in the critical path of I/O requests may be inefficient. For example, servicing a read request may comprise a first read operation to access logical-physical translations for logical addresses of the read request and a second read operation to retrieve data stored at the determined physical addresses. By way of further example, servicing a write request may comprise a first write operation to write data of the request at selected physical addresses of the NVM media and a second write operation to record logical-physical mappings between logical addresses of the write request and the selected physical addresses. In some aspects, a cache manager is configured to improve the operation of a computing device by, inter alia, efficiently caching logical-physical translation metadata, which may reduce the latency of logical-physical translation operations and, in turn, increase the rate at which I/O requests are serviced. Aspects of the disclosure may further improve operation of the computing device by, inter alia, improving the efficiency of cache management operations pertaining to logical-physical translation metadata (e.g., cache flush and/or write-back operations).

In some aspects, a cache manager implements a method for managing logical-physical translation metadata comprises caching mapping entries configured to associate logical addresses with physical addresses of a non-volatile memory system within a cache comprising a plurality of segments. The method may comprise flushing mapping entries corresponding to a group of logical addresses from the cache to persistent storage. The method may also include flushing that comprises searching segments of the cache with a masked search pattern configured to match mapping entries having logical addresses within the group. The mapping entries determined to match the masked search pattern may then be written to the persistent storage.

In other aspects, an apparatus comprises an indexer configured to assign translation entries pertaining to a non-volatile memory device to respective segments of a cache comprising a plurality of segments based on hash values of logical addresses of the translation entries. The apparatus may further comprise a search engine configured to search respective segments of the cache and a cache manager. In response to a request to retrieve a translation entry of a logical address from the cache, the cache manager may be configured to assign the logical address to a segment of the cache by use of the indexer and compare the logical address to translation entries cached within the assigned segment of the cache by use of the search engine.

In yet other aspects, a System-on-Chip (SoC) comprises a host interface to communicate with a host system, a cache comprising a plurality of segments, each segment configured to store entries of a logical-physical translation layer pertaining to a non-volatile memory (NVM) medium, a search engine to identify entries cached within respective segments of the cache that match criteria comprising a search pattern and a mask, the mask configured to selectively disable specified regions of the search pattern, a hardware-based processor, and a memory storing processor-executable instructions that, responsive to execution by the hardware-based processor, implement a cache manager. The cache manager implemented by the hardware-based processor may be configured to flush entries pertaining to an extent of logical addresses from the cache. To flush the entries pertaining to the extent of logical addresses, the disclosed cache manager may configure the search engine to search respective segments of the cache for entries matching first criteria, the search pattern of the first criteria comprising a logical address within the extent of logical addresses and the mask of the first criteria configured to disable at least one region of the search pattern. The cache manager may be further configured to write entries determined to match the second search criteria to the persistent storage.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations for managing logical-physical translation metadata are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
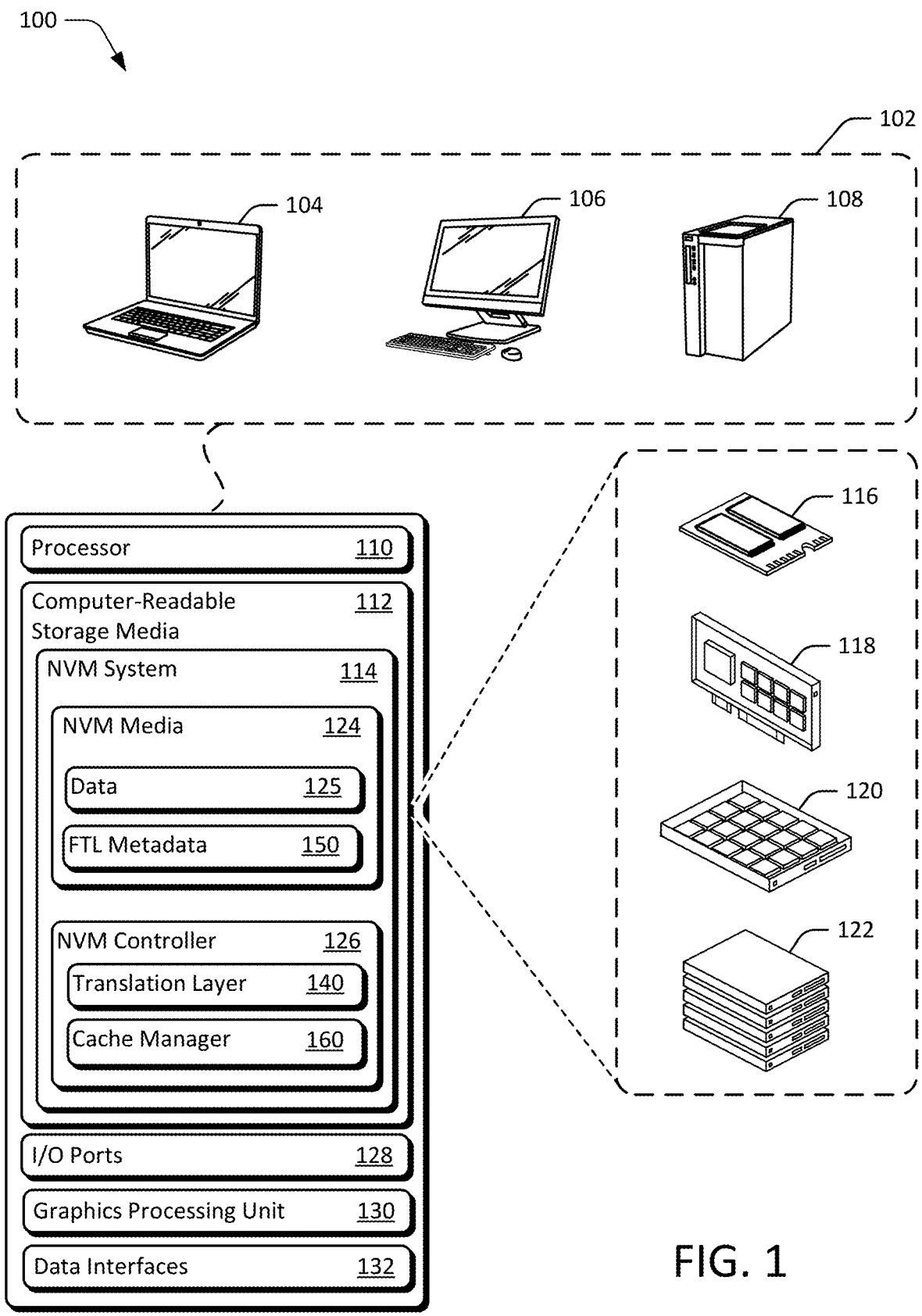
FIG. 1 illustrates an example operating environment having devices comprising a logical-physical metadata cache implemented in accordance with one or more aspects of the disclosure.

Conventional techniques for managing logical-physical translation metadata are inefficient and can result in increased wear of the NVM media (increased program/erase rate) and reduced performance, particularly when used with certain types of NVM media (e.g., NVM media having asymmetric and/or write-once characteristics). Generally, firmware is used to manage a data path of a storage drive in an end-to-end manner, such as by translating data commands received through, inter alia, a host interface. Processing I/O requests and/or commands may involve translating logical addresses to physical addresses (and/or recording logical-physical translation metadata). As used herein, a logical address refers to any suitable means for referencing a memory and/or storage resource including, but not limited to, an identifier, an address, a logical block, a logical page, a logical block address (LBA), a logical page address, a virtual address, a virtual memory address, and/or the like. As used herein, a physical address refers to any suitable means for referencing a physical storage resource, such as a memory and/or storage location, which may include, but is not limited to a page, a physical page, a block, a physical block, a sector, a segment, a division, an erase block, collection or set of physical storage locations, and/or the like. As illustrated above, translation schemes that maintain data in-place may result in write amplification; servicing a request to write data in-place may require an entire division of the NVM media (e.g., an erase block) to be erased and rewritten for each individual write, even if only a small portion of the division is being modified.

In some aspects, a translation layer maintains FTL metadata pertaining to NVM media, which may enable data to be written out-of-place at any suitable physical storage location. Modifying data out-of-place may avoid write amplification and remove erasure from the critical path of many I/O operations. Data made obsolete by out-of-place updates need not be erased immediately, but instead may be removed in background garbage collection, grooming, consolidation, and/or other background operations implemented outside of critical latency paths. The disclosed translation layer may be configured to maintain FTL metadata within persistent storage. The FTL metadata may include entries configured to map logical addresses of a logical address space to physical addresses of the NVM media (e.g., may associate data stored on the NVM media with respective logical addresses, indicate whether the data are valid, and so on). In some aspects, the translation layer is configured to maintain the FTL metadata pertaining to an NVM medium on the NVM medium itself (e.g., within a reserved section of the NVM medium).

Although out-of-place update techniques utilizing flexible logical-physical translations may help avoid write amplification, conventional approaches to managing FTL metadata can adversely impact performance. As disclosed above, processing I/O requests may comprise translating logical addresses to physical addresses (and/or recording logical-physical translations). Accessing logical-physical translations from persistent storage in the critical path of such I/O requests may increase latency and reduce the rate at which I/O requests can be completed.

In contrast with conventional approaches to logical-physical translation, the described apparatus and techniques may implement logical-physical translation operations by use of mapping entries maintained in a cache. The cache may comprise high-performance memory, such as random-access memory (RAM) or the like. Maintaining FTL metadata in a cache may increase the rate of logical-physical translation operations which, in turn, may increase the rate at which corresponding I/O requests may be completed (e.g., reduce the latency of the I/O requests).

In some aspects, an NVM storage system comprises a translation layer to manage logical-physical translations between logical addresses and physical addresses. The translation layer may be configured to maintain FTL metadata pertaining to NVM media of the NVM storage system. The FTL metadata may comprise entries configured to map respective logical addresses to corresponding physical addresses of the NVM media, as disclosed herein. The translation engine may maintain the FTL metadata within persistent storage (e.g., the NVM media of the NVM storage system).

The translation engine may be configured to determine logical-physical translations in response to input/output (I/O) requests received through, inter alia, an interface (e.g., a host interface, NVM interface, and/or the like). The I/O requests may comprise and/or reference logical addresses. The translation engine may be configured to translate the I/O requests, which may comprise translating logical addresses of the I/O requests to corresponding physical addresses. Translating a request to read data may comprise utilizing the FTL metadata to map a logical address of the read request to a physical address. Translating the write request may comprise recording a mapping between a logical address of the write request and the physical address selected to store data of the request on the NVM media.

As disclosed above, accessing the FTL from persistent storage during the critical path of I/O requests may be inefficient and impact the rate at which such I/O requests can be completed. The translation engine may be configured to improve the operation of a computing device by, inter alia, admitting selected portions of the FTL metadata (and/or portions thereof) in a cache. The cache may comprise and/or be implemented by high-performance memory resources, such as on-board memory, on-chip memory, on-die memory, on-board RAM, dynamic RAM (DRAM), static RAM (SRAM), hardware registers, host memory (a host memory buffer), and/or the like. The translation engine may comprise and/or be coupled to a cache manager configured to, inter alia, store entries of the FTL metadata within the cache. The cache manager may be configured to retrieve FTL entries from the cache in response to translation requests. The cache manager may, therefore, obviate the need for accessing persistent FTL metadata storage in the critical path of read requests. The cache manager may be further configured to store modifications to FTL metadata within the cache, which may obviate the need for writing such translations to persistent FTL metadata storage in the critical path of data write requests. The cache manager may be configured to flush contents of the cache in one or more background operations (e.g., the cache manager may implement a write-back cache mode and/or the like).

In some aspects, the disclosed cache manager may further improve performance by, inter alia, implementing novel cache segmentation and search functionality. The cache manager may be configured to divide the cache into a plurality of segments (or sub-segments), each segment comprising a plurality of cache blocks capable of holding one or more FTL entries. In some aspects, each cache segment comprises and/or is implemented by respective memory resources, e.g., contiguous memory, on-board memory, on-chip memory, on-die memory, on-board RAM, DRAM, SRAM, hardware registers, host memory buffer (HMB) segment, and/or the like. The cache manager may be configured to index the segments by logical address. An indexer may be configured to, inter alia, assign, route, and/or otherwise associate logical addresses (and/or entries pertaining to the logical addresses) with respective segments of the cache. The indexer may be configured to distribute entries between the plurality of segments in accordance with a first logical address distribution scheme (a cache distribution scheme). The first logical address distribution scheme may be configured to balance the distribution of entries between the segments of the cache, regardless of the order, pattern, and/or distribution of I/O pertaining to the logical addresses. As disclosed in further detail herein, balancing the distribution of entries across segments of the cache may reduce cache search latency (e.g., the search time of a segment may be proportional to a number of entries cached within the segment), which may further reduce the latency of, e.g., read requests. The indexer may be further configured to adapt the first logical address distribution scheme to have low latency (e.g., implement low-latency cache segment assignments), which may reduce the latency of I/O involving insertion into the cache, such as write I/O. In some aspects, the first logical address distribution scheme comprises a distribution function configured to uniformly distribute logical addresses across segments of the cache. The first distribution scheme may comprise a hash function; the indexer may be configured to associate logical addresses (and/or entries pertaining to the logical addresses) with respective cache segments based on hash codes, values, digests, signatures and/or other data derived from the logical addresses (e.g., by applying a hash function to the logical addresses).

In some aspects, the cache manager is configured to arrange the cache into a plurality of primary segments and a secondary segment (e.g., the segments of the cache may comprise a plurality of primary segments and the secondary segment). The indexer may be configured to distribute logical addresses between the primary segments, as disclosed herein. The primary segments may, therefore, be referred to as direct or assignable segments. The cache manager may utilize the secondary segment as overflow capacity (the secondary segment may be referred to as an extra, supplemental, or overflow segment). Admitting a new entry into the cache may comprise the cache manager assigning the new entry to one of the primary segments (based on the logical address of the new entry in accordance with the first logical address distribution scheme), determining whether the primary segment is capable of caching the new entry, and caching the new entry in one of the primary segment and the secondary segment based on the determining. Determining whether the primary segment can cache the new entry may comprise determining whether the primary segment has sufficient capacity to store the new entry (e.g., comprises one or more free cache blocks). In some aspects, the determining may further comprise determining whether one or more entries cached within the primary segment should be evicted from the cache, e.g., in accordance with a cache eviction algorithm, such as Least Recently Unused (LRU), First In First Out (FIF0), access count, last access time, whether the entries have been written-back to primary storage (e.g., whether the entries are dirty), and/or the like.

A search engine may be configured to perform low-latency search operations within respective segments of the cache. The search engine may comprise and/or be implemented by search circuitry (e.g., may comprise a hardware search engine). In some aspects, the search engine is configured to implement low-latency search operations pertaining to a plurality of entries at least partially in parallel. The search engine may be configured to search each entry cached within respective cache segments in parallel. Retrieving an entry corresponding to a specified logical address from the cache may comprise the cache manager: a) determining the segment assigned to the specified logical address by use of the segment indexer and b) searching the determined segment for an entry matching the specified logical address by use of the search engine (as opposed to searching the entire cache). Assigning the specified logical address to the determined segment may comprise a low-latency hash operation, as disclosed herein. In some aspects, retrieving the entry comprises a) determining a primary segment assigned to the specified logical address and b) searching the primary segment and/or secondary segment with the specified logical address. The cache manager may search the secondary segment in response to failing to find an entry matching the specified logical address within the primary segment. Alternatively, the cache manager may configure the search engine to search the primary segment and the secondary segment at least partially in parallel.

The search engine may be adapted to implement search operations within respective segments of the cache in accordance with configurable search criteria. The search criteria may comprise and/or be implemented by a pattern buffer configured to hold a logical address search pattern (e.g., a target logical address and/or portion thereof). The pattern buffer may comprise any suitable means for holding a logical address and/or logical address search pattern including, but not limited to, a register, a latch, a buffer, a hardware buffer, a memory buffer, and/or the like. Determining whether an entry matches the search criteria may comprise the search engine comparing contents of the pattern buffer (e.g., the target logical address) to the logical address of the entry. In some aspects, the search engine is configured to compare respective regions of the pattern buffer (and/or the target logical address held therein) to corresponding regions of the logical address of the entry. As used herein, a "region" of a logical address (and/or pattern buffer) refers to a portion of the logical address (and/or pattern buffer). A region may correspond to one or more bits of the logical address and/or pattern buffer (e.g., a bit, a bit a particular index of the logical address, a range of bits of the logical address, and/or the like). The search engine may be configured to implement masked search operations within respective cache segments.

In some aspects, the search engine is configured to compare the contents of the pattern buffer to the logical address of any entry by use of respective compare elements (e.g., hardware comparators), each corresponding to a respective region of the pattern buffer. The compare elements may be configured to indicate whether respective regions of a target logical address held within the pattern buffer match corresponding regions of the logical address of the entry (e.g., compare respective bits, nibbles, bytes, words, and/or the like). Determining whether the entry matches the search criteria may comprise a logical aggregation of the match determinations (e.g., an AND of match respective match determinations, NOR of mismatch respective mismatch determinations, and/or the like).

The search engine may also be configured to search a plurality of entries at least partially in parallel. The search engine may comprise a plurality of match components, each match component configured to be coupled to a respective entry within a respective segment of the cache (and/or respective cache block of the segment) and being configured to determine whether the search criteria of the search engine matches the respective entry, as disclosed herein (e.g., each match component may comprise respective compare elements, as disclosed herein). In some cases, the search engine is configured to search a plurality of entries of the cache segment at least partially in parallel, each of the plurality of entries being evaluated by a respective match component of the search engine. The search engine may also include match components corresponding to each cache block of a segment and, as such, may be capable of searching entries cached within the segment at least partially in parallel.

In some aspects, the search engine may be further configured to mask designated regions of the pattern buffer and/or target logical address held therein. As used herein, "masking" a region of the pattern buffer and/or target logical address refers to treating the region as a matching region regardless of the contents thereof (e.g., ignoring comparisons pertaining to the region). A masked region may be referred to as a wildcard region, ignore region, disabled region, of the like. The search engine may be configured to disable compare elements associated with masked regions (and/or disable compare elements of respective match components of the search engine), which may comprise setting outputs of the disabled compare elements to "match" and/or ignoring "mismatch" determinations of the disabled compare elements. The search engine may, therefore, be configurable to implement masked search operations in which comparisons pertaining to one or more regions of the pattern buffer (and/or target logical address of the search) are ignored.

In some aspects, the search criteria of the search engine further comprises and/or is implemented by a mask buffer. The mask buffer may be configured to hold a plurality of mask values, each mask value configured to selectively mask a respective portion of the pattern buffer (and/or target logical address held therein). The mask buffer may be set to selectively mask respective regions of the pattern buffer, as disclosed herein (e.g., selectively disable comparisons pertaining to the respective regions). In some aspects, the mask buffer may be configured to hold a plurality of bit values, each bit value corresponding to a respective region of the pattern buffer (e.g., a respective bit of the target logical address).

The cache manager may utilize masked search functionality of the search engine to improve the performance of cache management operations, such as flush operations, write-back operations, and/or the like. A flush operation may comprise writing entries stored within the cache back to the FTL metadata maintained within persistent storage. A flush operation may comprise updating respective portions of the FTL metadata (e.g., respective FTL pages or blocks, each configured to store logical-physical translation metadata pertaining to a respective group of logical addresses). Flushing cache data to an FTL page may comprise a) identifying entries pertaining to the FTL page within the cache, b) updating the FTL page with the identified entries, and c) writing the updated FTL page to persistent storage. As used herein, an entry that pertains, corresponds, and/or is associated with an FTL page may refer to an entry having a logical address included in the FTL page (e.g., a logical address that matches a logical address of an entry stored within the FTL page). As disclosed above, the cache manager may be configured to distribute entries between segments of the cache in accordance with a first logical address distribution (e.g., a logical address indexing scheme configured to balance distribution across the plurality of cache segments). FTL pages, however, may comprise entries having a second logical address distribution scheme different from the first logical address distribution scheme (e.g., may cover contiguous logical address ranges). The entries pertaining to respective FTL pages, therefore, may be distributed across any of the plurality of segments of the cache. Accordingly, identifying entries pertaining to an FTL page within the cache may comprise searching each segment of the cache for each logical address included in the FTL page. Identifying the entries pertaining to the FTL unit may comprise X search operations in each of the N segments of the cache, where X is the number of logical addresses included in the FTL page (N·X search operations performed in parallel within each of the N cache segments, or N·X·C individual search operations, where C is the number of entries held within the respective segments).

The cache manager may be configured to leverage the masked search functionality of the search engine to, inter alia, improve the performance of flush operations. As disclosed above, a masked search operation may comprise designating one or more regions of the pattern buffer (and/or target logical address) as a wildcard region. The cache manager may configure the search engine to perform a masked search operation configured to match the logical addresses included in respective FTL pages. By way of non-limiting example, the FTL pages may comprise entries for contiguous ranges of logical addresses (e.g., each FTL page may comprise 1024 entries pertaining to a base logical address B through B+1023). In this example, the cache manager may identify entries pertaining to a particular FTL page by configuring the search engine to search respective segments of the cache with a masked logical address search pattern formed by masking low-order bits of any one of the logical addresses of the particular FTL page (e.g., masking the 10 low-order bits of the target logical address). The masked search may comprise a) setting the pattern buffer to any one of the logical addresses of the FTL unit and b) masking the low-order bits of the pattern buffer by use of the mask buffer, as disclosed herein. In the example above, the masked search functionality of the search engine may enable the cache manager to perform the equivalent of 1024 search operations in a single masked search.

The following discussion describes an operating environment, techniques that may be employed in the operating environment, and a system in which components of the operating environment can be embodied. In the context of the present disclosure, reference is made to the operating environment by way of example only.

Operating Environment

FIG. 1 illustrates an example operating environment 100 having a host system 102, capable of storing or accessing various forms of data or information. Examples of a host system 102 may include a laptop computer 104, desktop computer 106, and server 108, any of which may be configured as user device, computing device, or as part of a storage network or cloud storage. Further examples of the host system 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on. Generally, the host system 102 may communicate or store data for any suitable purpose, such as to enable functionalities of a particular type of device, provide a user interface, enable network access, implement gaming applications, playback media, provide navigation, edit content, provide data storage, or the like.

The host system 102 includes a processor 110 and computer-readable media 112. The processor 110 may be implemented as any suitable type or number of processors, either single-core or multi-core, for executing instructions or commands of an operating system or other applications of the host system 102. The computer-readable media 112 (CRM 112) includes memory (not shown), which may include any suitable type or combination of volatile memory or non-volatile memory. For example, the volatile memory of host system 102 may include various types of random-access memory (RAM), dynamic RAM (DRAM), static RAM (SRAM) or the like. The non-volatile memory may include read-only memory (ROM), electronically erasable programmable ROM (EEPROM) or Flash memory (e.g., NAND Flash). These memories, individually or in combination, may store data associated with a user, applications, and/or an operating system of host system 102.

The NVM system 114 may be configured as any suitable type of data storage and/or memory component, such as a storage device, storage drive, storage array, storage volume, or the like. Although described with reference to the host system 102, the NVM system 114 may also be implemented separately as a standalone device or as part of a larger storage collective, such as a network-attached storage device, external storage drive, data center, server farm, or virtualized storage system (e.g., for cloud-based storage or services). Examples of the NVM system 114 include a non-volatile memory express (NVMe) solid-state drive 116, a peripheral component interconnect express (PCIe) solid-state drive 118, a solid-state drive 120, and a storage array 122, which may be implemented with any combination of storage devices or storage drives, and/or the like.

The NVM system 114 includes NVM media 124 and an NVM media controller (NVM controller 126) for managing various operations or functionalities of the NVM system 114. The NVM media 124 may include or be formed from persistent, non-transitory, and/or non-volatile memory and/or storage media and/or devices on which data 125 or information of the host system 102 may be stored. The NVM media 124 may be implemented with any type or combination of suitable memory and/or storage media including, but not limited to: solid-state memory media, Flash memory, NAND Flash memory, NOR Flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), and/or the like. In some cases, the data 125 stored to the storage media 124 is organized into files of data (e.g., content) or data objects that are stored to the NVM system 114 and accessed by the host system 102. The file types, sizes, or formats of the data 125 may vary depending on a respective source, use, or application associated with the file. For example, the data 125 stored to the NVM system 114 may include audio files, video files, text files, image files, multimedia files, spreadsheets, and so on. The data 125 may be referenced by logical address.

Generally, the NVM controller 126 manages operation of the NVM system 114 and enables the host system 102 to access the NVM media 124. The NVM controller 126 may be implemented through any suitable combination of hardware, firmware, or software to provide various functionalities of the NVM system 114. The NVM controller 126 may also manage or administrate internal tasks or operations associated with the NVM media 124, such as data caching, data migration, garbage collection, thermal management (e.g., throttling), power management, and/or the like. The NVM controller 126 may receive I/O requests from the host system 102 (host I/Os) for data access and queue (or generate) internal I/Os associated with internal operations for the NVM media 124. Generally, the NVM controller 126 may perform media I/Os for access of the NVM media 124 that correspond to scheduled host I/Os for data access and/or internal I/Os for internal operations or tasks associated with the NVM media 124.

The host system 102 may also include I/O ports 128, a graphics processing unit 130 (GPU 130), data interfaces 132, and so on. Generally, the I/O ports 128 allow a host system 102 to interact with other devices, peripherals, or users. For example, the I/O ports 128 may include or be coupled with a universal serial bus, human interface devices, audio inputs, audio outputs, or the like. The GPU 130 processes and renders graphics-related data for host system 102, such as user interface elements of an operating system, applications, or the like. In some cases, the GPU 130 accesses a portion of local memory to render graphics or includes dedicated memory for rendering graphics (e.g., video RAM) of the host system 102. The data interfaces 132 of the host system 102 provide connectivity to one or more networks and other devices connected to those networks. The data interfaces 132 may include wired interfaces, such as Ethernet or fiber optic interfaces for communication over a local network, intranet, or the Internet. Alternatively or additionally, the data interfaces 132 may include wireless interfaces that facilitate communication over wireless networks, such as wireless LANs, wide-area wireless networks (e.g., cellular networks), and/or wireless personal-area-networks (WPANs).

In the FIG. 1 example, the NVM controller 126 further comprises a translation layer 140. The translation layer 140 may be configured to implement logical-physical translations pertaining to the NVM media 124, as disclosed herein. The translation layer 140 may be configured to record metadata comprising logical-physical translations in persistent storage. In FIG. 1, the translation layer 140 is configured to maintain FTL metadata 150 on the NVM media 124. The FTL metadata 150 may comprise logical-physical translations pertaining to the data 125 stored on the NVM media 124. The FTL metadata 150 may comprise a plurality of entries, each entry configured to map a respective logical address to a physical address of corresponding data 125 stored on the NVM media 124.

The translation layer 140 may comprise and/or be operably coupled to a cache manager 160. The cache manager 160 may comprise and/or be coupled to a cache, which may comprise and/or be implemented by memory of the NVM system 114, host system 102 (e.g., a HMB), and/or the like (cache not shown in FIG. 1 to avoid obscuring details of the illustrated aspects). The cache manager 160 may be configured to cache selected portions of the FTL metadata 150 within the cache. The cache manager 160 may be configured to retrieve entries from the cache and/or insert entries into the cache in response to translation requests issued by the translation layer 140. The cache manager 160 may, therefore, obviate the need for accessing FTL metadata 150 within persistent storage in the critical path of I/O requests. The cache manager 160 may be further configured to flush contents of the cache to the FTL metadata 150 (e.g., flush "dirty" entries that differ from the corresponding entries of the FTL metadata 150 within persistent storage). Further detail regarding the operation of the translation layer 140 and cache manager 160 are described throughout the disclosure.

Figure 2:
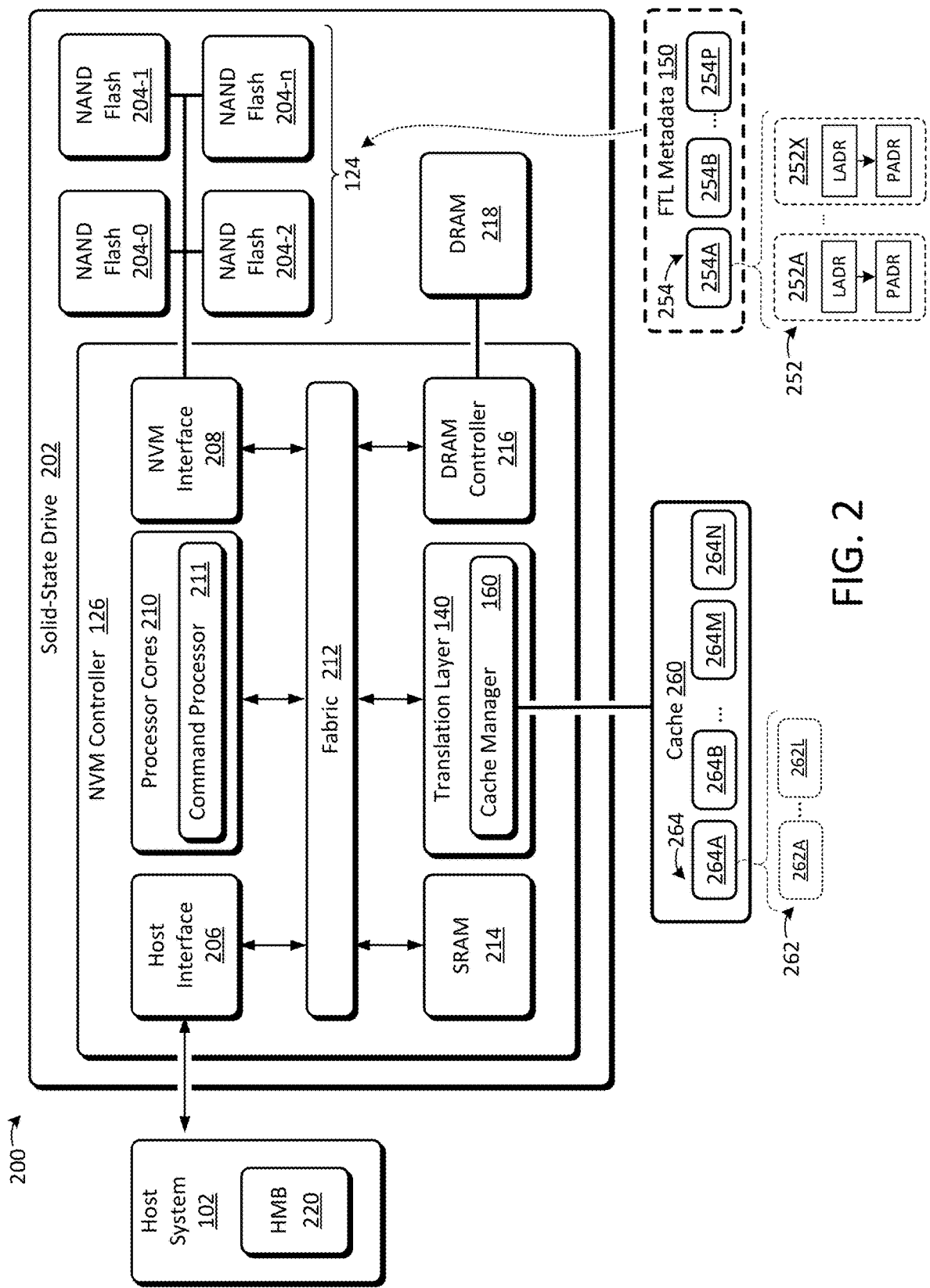
FIG. 2 illustrates example configurations of a translation layer and cache manager of an NVM system, such as the NVM system illustrated in FIG. 1.

FIG. 2 illustrates example configurations of a translation layer 140, cache manager 160, and FTL cache (cache 260) implemented in accordance with one or more aspects disclosed herein (e.g., as part of the NVM system 114 illustrated in FIG. 1). In FIG. 2, the translation layer 140, cache manager 160, and cache 260 are illustrated in the context of an NVM system 114 that is implemented as a solid-state storage drive (SSD) 202. The SSD 202 may be coupled to any suitable host system 102 and implanted with NVM media 124 comprising NAND Flash devices 204-1 through 204-n, where n is any suitable integer. In some cases, the NAND Flash devices 204 include multiple Flash channels of memory devices, dies, or chips that may be accessible or managed on a channel-level (group of devices) or device-level (individual devices). Although illustrated as components of the SSD 202, the translation layer 140, cache manager 160, and/or cache 260 may be implemented separately from or external to the NVM system 114 (SSD 202); e.g., may be implemented as part of a storage media accelerator or aggregate storage controller coupled between a host system 102 and one or more NVM systems 114.

Generally, operations of the SSD 202 are enabled or managed by an instance of the NVM controller 126, which in this example includes a host interface 206 to enable communication with the host system 102 and an NVM interface 208 to enable access to the NVM media 124. The host interface 206 may be configured to implement any suitable type of storage interface or protocol, such as serial advanced technology attachment (SATA), universal serial bus (USB), PCIe, advanced host controller interface (AHCI), NVMe, NVM-over Fabric (NVM-OF), NVM host controller interface specification (NVMHCIS), small computer system interface (SCSI), serial attached SCSI (SAS), secure digital I/O (SDIO), Fibre channel, any combination thereof (e.g., an M.2 or next generation form-factor (NGFF) combined interface), or the like. Alternatively or additionally, the NVM interface 208 may implement any suitable type of storage media interface, such as a Flash interface, Flash bus channel interface, NAND channel interface, physical page addressing (PPA) interface, or the like.

In various aspects, components of the SSD 202 or NVM controller 126 provide a data path between the host interface 206 to the host system 102 and the NVM interface 208 to the NVM media 124. In this example, the NVM controller 126 includes processor cores 210 for executing a kernel, firmware, or a driver to implement functions of the NVM controller 126. The processor cores 210 may comprise and/or be implemented by processing circuitry, such as a general-purpose processor, an application-specific integrated-circuit (ASIC), a memory controller, storage controller, communication controller, application-specific standard product (ASSP), digital signal processor (DSP), a SoC, programmable SoC (PSoC), system-in-package (SiP), field-programmable gate array (FPGA), and/or the like. The processor cores 210 may comprise and/or implement one or more command processors 211 configured to, inter alia, service requests and/or commands (e.g., host I/O). In some cases, the processor cores 210 may also execute processor-executable instructions to implement the translation layer 140 or cache manager 160 of the NVM controller 126. Alternatively or additionally, the translation layer 140 or cache manager 160 may execute from or run on dedicated hardware or processor cores.

The NVM controller 126 may comprise a fabric 212, which may include control and data buses configured to operably couple and/or enable communication between components of the NVM controller 126. For example, the translation layer 140 and/or cache manager 160 may communicate with the host interface 206, NVM interface 208, processor cores 210 (e.g., firmware), and/or NVM interface 208 to exchange data, information, or I/Os within the NVM controller 126. A static random-access memory 214 of the NVM controller 126 may store processor-executable instructions or code for firmware or drivers of the NVM controller 126, which may be executed by the processor cores 210 (and/or may implement one or more command processors 211). The NVM controller 126 may further comprise and/or be coupled to a dynamic random-access memory (DRAM) controller 216 and associated DRAM 218 for storage or caching various data as the NVM controller 126 moves data between the host system 102, storage media 124, or other components of the NVM controller 126 (e.g., may comprise portions of the cache 260, as disclosed herein).

The translation layer 140 may be configured to maintain FTL metadata 150 pertaining to the NVM media 124. The translation layer 140 may be configured to maintain the FTL metadata 150 in persistent, non-transitory, and/or non-volatile storage. In FIG. 2, the translation layer 140 is configured to maintain the FTL metadata 150 on the NVM media 124. The disclosure is not limited in this regard, however, the translation layer 140 may be configured to maintain the FTL metadata 150 (and/or portions thereof) in any suitable storage location, such as on-board persistent storage, dedicated metadata storage, and/or the like.

In the FIG. 2 example, the FTL metadata 150 comprises, inter alia, entries 252 that include logical-physical translations pertaining to data 125 stored on the NVM media 124. An entry 252 of the FTL metadata 150 may be configured to associate a logical address (LADR) with a physical address (PADR) at which data 125 pertaining to the logical address are stored. The entries 252 may, therefore, comprise and/or be referred to as mapping entries, translation entries, FTL entries, mapping nodes, translation nodes, FTL nodes, and/or the like. The entries 252 may comprise any suitable data format in any suitable encoding and/or structure including, but not limited to, a tree, an array, an index, a table, a sequence, one or more tuples, one or more data pairs, one or more key-value pairs, one or more name-value pairs, and/or the like. An entry 252 may comprise any suitable information pertaining to a logical address, physical address, and/or corresponding data 124 stored on the NVM media 124, such as information pertaining to a file and/or object associated with the logical address, a division comprising the physical address (e.g., an erase block of the physical address), a wear-level of the physical address (and/or division thereof), an age of the data 125 (e.g., amount of time the data 125 have been retained at the specified physical address), and/or the like. Alternatively or additionally, an entry 252 may comprise logical-physical mapping metadata pertaining to a plurality of logical addresses (e.g., may be configured to the plurality of logical addresses with a corresponding plurality of physical addresses).

In some aspects, the FTL metadata 150 comprises one or more FTL pages 254, each FTL page 254 configured to cover a respective group of logical addresses. As used herein, an FTL page 254 that "covers" a logical address (or group of logical addresses) may refer to an FTL page 254 configured to store logical-physical translation metadata pertaining to the logical address (or group of logical addresses). An FTL page 254 that covers particular logical addresses may, therefore, refer to an FTL page 254 configured to store entries 252 comprising logical-physical translation metadata pertaining to the particular logical addresses. In FIG. 2, each FTL page 254 may be configured to cover X logical addresses (e.g., each FTL page 254 may be configured to hold X entries 252A-X, each comprising logical-physical translation metadata pertaining to a respective one of the X logical addresses).

The translation layer 140 may be configured to adapt FTL pages 254 of the FTL metadata 150 in accordance with physical characteristics of the persistent storage on which the FTL metadata 150 is maintained. In FIG. 2, the translation layer 140 may be configured to adapt the FTL pages 254 in accordance with physical characteristics of the NVM media 124. The adapting may comprise setting a size of the FTL pages 254 to correspond with a size of physical storage locations of the NVM media 124. The translation layer 140 may configure each FTL page 254 for storage within a respective page or block of the NVM media 124 (e.g., in respective physical pages). The size of the logical address range each FTL page 254 is configured to cover may be based on a size of the entries 252 and a size of the physical pages of the NVM media 124 (e.g., each FTL page 254 may be configured to store X entries 252 where X is derived by dividing the physical page size of the NVM media 124 by the size of an entry 252).

The translation layer 140 may be configured to distribute logical addresses between respective FTL pages 254 in accordance with a determined logical address distribution scheme (a persistent distribution scheme). The persistent distribution scheme may be adapted to enable the translation layer 140 to efficiently retrieve FTL pages 254 comprising logical-physical translation entries for particular logical addresses. The persistent distribution scheme may comprise indexing the FTL pages 254 by logical address, such that each FTL page 254 is configured to cover a respective group of logical addresses. In some aspects, the persistent distribution scheme comprises configuring each FTL page 254 to cover a respective logical address extent (e.g., a respective contiguous range of logical addresses). The FTL metadata 150 may comprise P FTL pages 254, each FTL page 254A-P configured to cover a respective range of X logical addresses (where P and X are suitable integers). The disclosure is not limited in this regard, however, and could be adapted to maintain FTL pages 254 comprising logical addresses distributed in accordance with any suitable logical address distribution scheme (e.g., each FTL page 254 may cover a respective group of non-contiguous logical addresses).

The NVM controller 126 is configured to service I/O requests received via, inter alia, the host interface 206. The I/O requests may comprise and/or reference logical addresses. Servicing the I/O requests may comprise the translation layer translating logical addresses of the I/O requests to physical addresses of the NVM media 124. By way of non-limiting example, servicing a request to write data to the SSD 202 may comprise a) the NVM interface 208 storing the data at selected physical addresses within the NVM media 124 (e.g., within one or more NAND flash devices 204 in accordance with an out-of-place scheme), and b) the translation layer 140 recording entries 252 to associate logical addresses of the user data with the selected physical addresses within an FTL page 254. By way of further non-limiting example, servicing a request to read data from the NVM media 124 may comprise a) the translation layer 140 reading an FTL page 254 to determine physical addresses of the requested data, and b) the NVM interface 208 retrieving the requested data from the determined physical addresses of the NVM media 124.

Accessing the FTL metadata 150 in the critical path of I/O requests may be inefficient and reduce the throughput of the SSD 202. As used herein, the "critical path" of an I/O request may refer to the sequence of operations involved in servicing the I/O request (e.g., the operations performed in order to, inter alia, generate a response to the I/O request). The critical path of an I/O request may, therefore, comprise operations that contribute to the latency of the I/O request. In the non-limiting examples above, the critical path of a write request may comprise a first write operation to store the user data within the NVM media 124 and a second write operation to update the FTL metadata 150 on the NVM media 124 (e.g., two NVM write operations), and the critical path of a read request may comprise a first read operation to access FTL metadata 150 stored on the NVM media 124 and a second read operation to read the requested data from the NVM media 124 (e.g., two read NVM read operations).

In FIG. 2, a cache manager 160 is configured to reduce the latency of I/O requests by, inter alia, caching portions of the FTL metadata 150 in high-performance cache memory (e.g., within a cache 260). The cache 260 may comprise and/or be implemented by memory resources of the SSD 202, such as the SRAM 214, DRAM 218, other on-board memory resources, and/or the like (e.g., may comprise on-board cache resources). Alternatively, or in addition, the cache 260 may comprise and/or be implemented by memory resources of the host system 102, such as a an HMB 220. The cache 260 may comprise a plurality of cache blocks 262, each configured to cache one or more entries 252 of the FTL metadata 150. The cache manager 160 may be configured to reference and/or index entries 252 within the cache 260 by logical address; tags of the cache blocks 262 may comprise and/or correspond to logical addresses of the entries 252 cached therein.

In some aspects, the cache manager 160 is configured to maintain substantially all of mapping entries 252 of the FTL metadata 150 within the cache 260; the cache manager 160 may be configured to transfer substantially all of entries 252 of the FTL metadata 150 into the cache 260 during initialization of the SSD 202 (and/or in background prefetch operations). Alternatively, the cache manager 160 may be configured to maintain selected portions of the FTL metadata 150 within the cache 260. The cache manager 160 may be configured to selectively admit entries 252 into the cache 260 in accordance with a suitable cache admission policy. In some aspects, the cache manager 160 admits entries 252 into the cache 260 in response to cache misses. As used herein, a cache miss (or translation miss) refers to a request to retrieve an entry 252 for a logical address that has not been admitted into the cache 260. In response to a cache miss pertaining to particular logical addresses, the cache manager 160 may be configured to retrieve entries 252 for the logical addresses from the FTL metadata 150 and admit the retrieved entries 252 into the cache 260. Admitting an entry 252 into the cache 260 may comprise storing the entry 252 within a selected cache block 262. The cache manager 160 may be further configured to manage contents of the cache 260, which may comprise selectively evicting entries 252 from the cache 260 in accordance with a suitable eviction policy (e.g., an LRU eviction policy, FIFO eviction policy, access time eviction policy, and/or the like). In some aspects, the cache manager 160 is further configured to maintain a dirty map pertaining to the cache 260 (the dirty map not shown in FIG. 2 to avoid obscuring details of the illustrated aspects). The dirty map may be configured to identify dirty data within the cache 260 (e.g., identify dirty entries 252 and/or dirty FTL pages 254). As used herein, dirty data refers to data that have been modified in cache storage but have not been writing to persistent storage. A dirty entry 252 within the cache 260 may refer to an entry 252 that has been modified within the cache 260 but has not been written to the FTL metadata 150 (the dirty entry 252 may differ from the corresponding entry 252 of the FTL metadata 150 on the NVM media 124). A dirty FTL page 254 refers to an FTL page 254 that covers the logical address of a dirty entry 252. An FTL page 254 may be marked as dirty in response to modifying an entry 252 covered by the FTL page 254 within the cache 260.

As illustrated in FIG. 2, the cache manager 160 may be configured to further improve I/O performance by, inter alia, dividing the cache 260 into a plurality of cache segments or sub-segments (segments 264). The segments 264 of the cache 260 may comprise and/or be implemented by respective cache resources, such as continuous memory, contiguous memory addresses, memory range, SRAM 214, DRAM 218, HMB 220, and/or the like. In FIG. 2, each segment 264 of the cache 260 comprises a plurality of cache blocks 262 (e.g., comprises L cache blocks 262A-262L, where L is any suitable integer). The cache manager 160 may be configured to index the cache blocks by logical address.

The cache manager 160 may be further configured to assign logical addresses to respective segments 264 such that a distribution of the logical addresses (and/or corresponding entries 252) between the respective segments 264 is substantially balanced. The cache manager 160 may be configured to distribute logical addresses (and/or entries 252 pertaining to the logical addresses) between the segments 264 of the cache 260 in accordance with a cache distribution scheme. The cache distribution scheme may be configured to uniformly distribute logical addresses across segments 264 of the cache 260. The cache distribution scheme may be further configured to assign segments 264 in index operations having a low, fixed latency (in contrast to other schemes, such as tree and/or index balancing schemes that often involve complex, variable-latency operations during insertion and/or lookup). The cache distribution scheme may be configured to balance distribution of logical addresses across the segments 264 regardless of the order, pattern, and/or sequence in which entries 252 pertaining to the logical addresses are admitted into the cache 260. The cache distribution scheme may be configured to prevent unbalanced distributions resulting from certain types of access patterns (e.g., as with conventional set associate caches, modulo distribution schemes, and/or the like). In some aspects, the cache distribution scheme comprises a hash distribution scheme in which logical addresses (and/or entries 252 pertaining to the logical addresses) are associated to respective segments 264 of the cache 260 based on hash values, codes, signatures, and/or digests derived therefrom. Assigning a logical address to a segment 264 of the cache 260 may comprise applying a hash function to the logical address and assigning the logical address to a segment 264 based on the output of the hash function. The hash function may be configured to produce hash values within a specified range, each hash value within the specified range corresponding to a respective one of the segments 264 of the cache 260.

The cache manager 160 may further comprise and/or be coupled to a search engine (not shown in FIG. 2 to avoid obscuring details of the illustrated aspects), which may be configured to implement search operations within respective segments 264 of the cache 260. As disclosed in further detail herein, the search engine may comprise hardware search elements configured to, inter alia, search one or more entries 252 (and/or cache blocks 262) of respective segments 264 of the cache 260 in parallel.

The translation layer 140 may utilize the cache manager 160 to implement translation operations pertaining to I/O requests, such as host I/Os. The translation operations may comprise retrieving entries 252 from the cache 260 corresponding to specified logical addresses, caching entries 252 comprising new and/or modified logical-physical translations, and so on. Retrieving an entry 252 for a particular logical address may comprise the cache manager 160 determining the segment 264 to which the particular logical address is assigned (based on the cache distribution scheme), and configuring the search engine to search the determined segment 264 for an entry 252 matching the particular logical address. Caching a new entry 252 may comprise assigning the new entry 252 to a segment 264 of the cache 260 and admitting the new entry 252 into the assigned segment 264 (and/or marking the new entry 252 and/or corresponding FTL page 254 as dirty). Modifying an entry 252 within the cache 260 may comprise retrieving the entry 252 and updating the retrieved entry 252 within the cache 260, as disclosed herein. Dividing the cache 260 into a plurality of segments 264, balancing the distribution of entries 252 between the segments 264 by logical address in accordance with a cache distribution scheme having a low, fixed latency, and/or implementing low-latency search operations within respective segments 264 of the cache 260, as disclosed herein, may, therefore, decrease the latency of translation operations which, in turn, may decrease the latency of I/O requests (e.g., decrease the latency of I/O requests having critical paths comprising one or more translation operations, such as read requests, write requests, and/or the like).

The cache manager 160 may be further configured to improve the performance of cache management operations, such as flush and/or write-back operations. As used herein, a "flush" operation refers to an operation to write dirty data from the cache 260 to persistent storage. The cache manager 160 may be configured to implement background flush operations periodically, in response to particular events (e.g., prior to shutdown of the SSD 202 and/or in response to the SSD 202 transitioning to a low-power state), in response to a dirty entry threshold, in response to a dirty FTL page threshold, and/or the like. Flushing the cache 260 may comprise the cache manager 160 transferring entries 252 from the cache 260 to the FTL metadata 150. The cache manager 160 may be configured to flush data to specified FTL pages 254. Flushing to an FTL page 254 may comprise the cache manager 160 identifying entries 252 of the FTL page 254 within the cache 260 and writing the identified entries 252 to the FTL page 254 (e.g., updating the FTL page 254 with the identified entries 252 and storing the updated FTL page 254 on the NVM media 124).

In some aspects, the cache manager 160 is configured to flush respective segments 264 of the cache 260. Flushing a segment 264 of the cache 260 may comprise writing entries 252 cached within the segment 264 to corresponding FTL pages 254. As disclosed above, the entries 252 cached within respective segments 264 of the cache 260 may pertain to logical addresses distributed in accordance with a first logical address distribution scheme (a cache distribution scheme). The entries 252 may be distributed within respective FTL pages 254 in accordance with a second logical address distribution scheme (a persistent distribution scheme), different from the first logical address distribution scheme. Accordingly, respective segments 264 of the cache 260 may comprise entries 252 pertaining to each of a plurality of different FTL pages 254 (e.g., logical addresses of the entries 252 cached within respective segments 264 may span a plurality of FTL pages 254). Flushing a segment 264 of the cache 260 may, therefore, involve updating a plurality of FTL pages 254 (may involve a plurality of NVM write operations), which may be inefficient and increase wear imposed on the NVM media 124.

The cache manager 160 may be configured to reduce the amount of NVM writes involved in flush operations by, inter alia, flushing cache data to respective FTL pages 254 (e.g., implementing flush operations by FTL page 254 as opposed to cache segment 264). Flushing cache data to an FTL page 254 may comprise the cache manager 160 identifying entries 252 corresponding to the FTL page 254 within the cache 260 and storing an updated FTL page 254 comprising the identified entries 252 in persistent storage (e.g., on the NVM media 124). As used herein, an entry 252 that corresponds to and/or is covered by an FTL page 254 refers to an entry 252 within the cache 260 that pertains to a logical address covered by the FTL page 254 (e.g., an entry 252 pertaining to a logical address included in the group of logical addresses covered by the FTL page 254). Due to the use of different logical address distribution schemes between the cache 260 and FTL metadata 150, the group of logical addresses covered by respective FTL pages 254 may be distributed across the plurality of segments 264 of the cache 260. Identifying entries 252 corresponding to an FTL page 254 may, therefore, comprise searching for entries 252 matching logical addresses covered by the FTL page 254 within each of the plurality of segments 264 comprising the cache 260. In FIG. 2, the FTL pages 254 may cover respective groups of X logical addresses (e.g., each FTL page 254 may be configured to hold X entries 252, each corresponding to a respective one of a group of X logical addresses). Identifying entries 252 covered by an FTL page 254 within the cache 260 may comprise searching respective segments 264 of the cache for entries 252 matching any of the X logical addresses covered by the FTL page 254 (where X is a suitable integer, such as a power of 2). Identifying entries 252 pertaining to an FTL page 254 may comprise X·N segment search operations (where N is the number of segments 264 comprising the cache 260), each segment search operation comprising comparing a respective one of the X logical addresses of the FTL page 254 to each of L entries 252 cached within a respective segment 264 of the cache 260 (where L is the number of entries 252 cached within the segment 264 and/or number of cache blocks 262 comprising the segment 264).

In some aspects, the cache manager 160 is configured to reduce the overhead of flush operations by, inter alia, configuring the search engine to implement masked search operations. The search engine may be configured to implement search operations within respective segments 264 of the cache 260. Implementing a search operation within a segment 264 may comprise comparing contents of a pattern buffer to logical addresses of entries 252 cached within the segment 264. As disclosed above, a search operation to retrieve an entry 252 pertaining to a specified logical address may comprise configuring the search engine to compare the logical addresses of entries 252 cached within the segment 264 to the specified logical address (e.g., setting the specified logical address in the pattern buffer of the search engine). The search engine may be configured to compare respective regions of the pattern buffer to corresponding regions of a logical address and may detect a match in response to determining that each region of the pattern buffer matches the corresponding region of the logical address (e.g., may comprise a plurality of bit comparisons, each configured to compare a respective bit held in the pattern buffer to a corresponding bit of the logical address). As used herein, a masked search operation may refer to a search operation in which comparisons pertaining to one or more regions of the pattern buffer (and/or target logical address held therein) are ignored and/or treated as matching, regardless of the contents thereof A masked search operation may comprise identifying entries 252 that pertain to any of the logical addresses within a particular group of logical addresses (e.g., match any of the logical addresses covered by a particular FTL page 254). The cache manager 160 may be configured to utilize masked search functionality to, inter alia, improve the efficiency of flush operations. A flush operation may comprise identifying entries 252 pertaining to a group of logical addresses within the cache 260 (e.g., may comprise identifying entries 252 pertaining to a particular FTL page 254, as disclosed herein). The cache manager 160 may be configured to identify entries 252 pertaining to respective FTL pages 254 by causing the search engine to perform masked search operations within respective segments 264 of the cache 260. The masked search operations may be configured to identify entries 252 pertaining to any of the logical addresses covered by the FTL page 254. A masked search operation may, therefore, replace X conventional search operations, where X is the number of logical addresses included in the FTL page 254.

Figure 3:
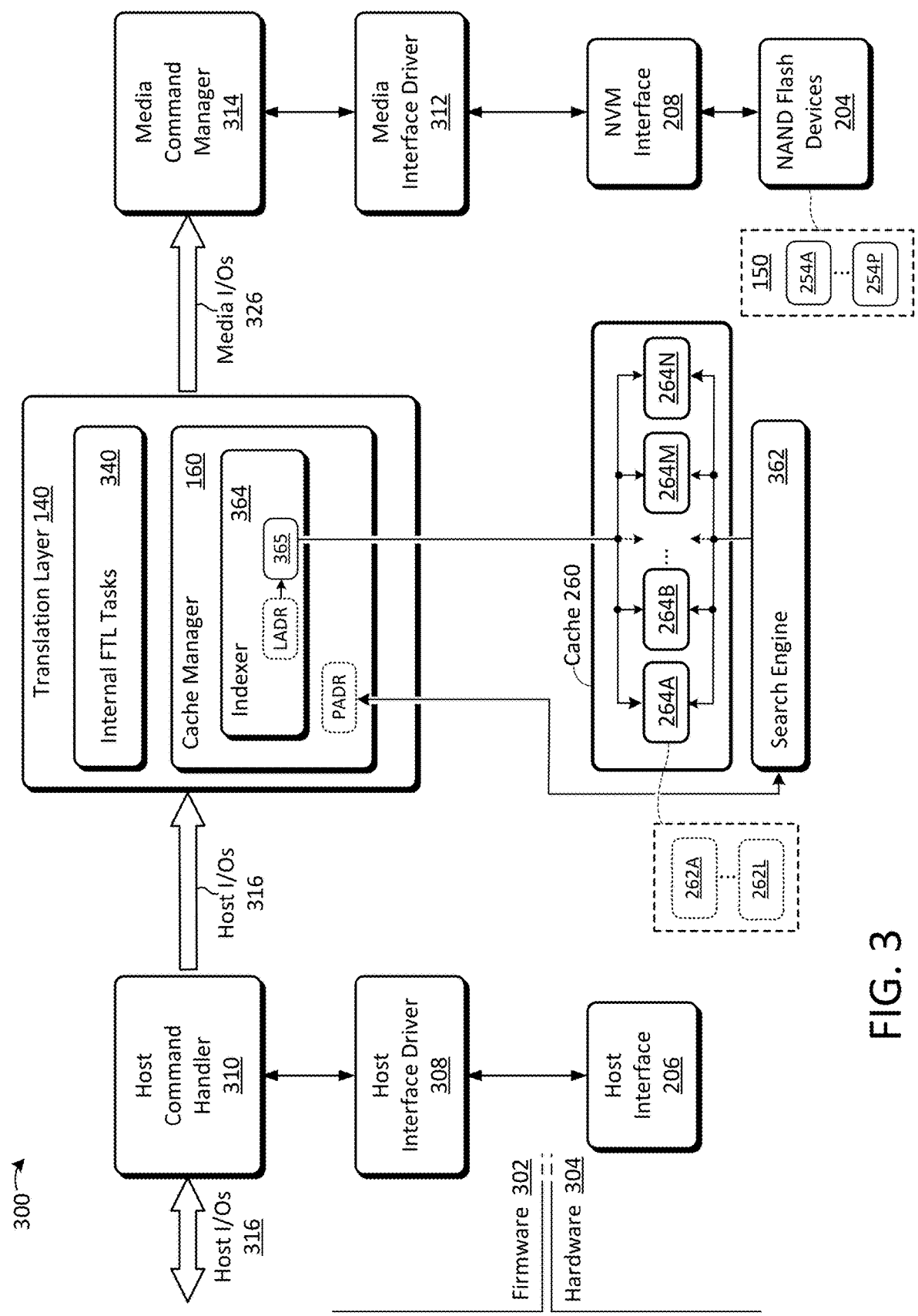
FIG. 3 illustrates example configurations of various hardware and firmware components for managing logical-physical translation metadata by an NVM controller, such as the NVM controller illustrated in FIG. 2.

FIG. 3 illustrates at 300 example configurations of various hardware and firmware components for the efficient management and/or caching of logical-physical translation metadata by an NVM controller, such as the NVM controller 126 illustrated in FIG. 2, as disclosed herein. In this example, the components of the NVM controller 126 are shown as abstracted entities that may be implemented in firmware 302 or hardware 304 of the NVM controller 126. This is but one example implementation of various components, any of which may be implemented separately from or in combination with other components described herein. Alternatively or additionally, any of the components described with reference to FIG. 2 or FIG. 3 may be implemented as an intellectual property block (IP block) or IP core configured as a unit of logic, cell, and/or integrated-circuit (IC) that provides various described features of a component. For example, a component of the NVM controller 126 (e.g., translation layer 140 and/or cache manager 160) may be implemented as an IP core or the IP block that includes a combination of hardware, firmware, or software to provide respective functionalities or implement respective operations of the component.

In this example, the hardware 304 of the NVM controller 126 includes NAND flash devices 204, a host interface 206, an NVM interface 208, and processor cores 210, which may be implemented as described with reference to FIG. 2. The hardware 304 of the NVM controller 126 may further comprise a cache 260 comprising a plurality of segments 264 and a cache search engine 362 (search engine 362) configured to implement search operations within respective segments 264 of the cache 260.

In some aspects, portions of the translation layer 140 and/or cache manager 160 are implemented on and/or by use of one or more processor cores 210 of the NVM controller 126. Generally, the firmware 302 of the NVM controller 126 assists the hardware 304 to manage the data path between the host system 102 and NVM media 124. In other words, the firmware 302 (e.g., translation layer 140 and/or cache manager 160) may be configured to translate commands or requests for data received from the host system 102 to enable access of the storage media 124, as disclosed herein.

In the FIG. 3 embodiment, the firmware 302 includes a host interface driver 308 to implement a host command handler 310 and a media interface driver 312 to implement media command manager 314. As shown in FIG. 3, host input/output commands 316 (host I/Os 316) are received by the host command handler 310 and sent to the translation layer 140 of the NVM controller 126. The translation layer 140 may process and/or schedule the host I/Os 316, which may then be performed as corresponding media input/output commands 326 (media I/Os 326) for storage media access through the media command manager 314. Processing a host I/O 316 may comprise the translation layer 140 implementing logical-physical translation operations pertaining to the host I/O 316, as disclosed herein.

In various aspects, the translation layer 140 manages command processing (e.g., host I/O 316 translation and scheduling) to facilitate movement of host system data within an NVM system 114 and/or through an NVM controller 126, such as to NVM media 124. The translation layer 140 may also monitor resources or health of the NVM media 124 (and/or NVM devices). For example, the translation layer 140 may monitor the NVM media 124 or cache DRAM 218 for an amount of free space, capacity, free blocks, bad blocks, write/programming cycle count, device/block wear pattern, power consumption, temperature, and/or the like. In some cases, the translation layer 140 includes internal FTL tasks 340 (internal tasks 340) for management of NVM media health and resources. These internal tasks 340 of the translation layer 140 or NVM controller 126 may include tasks or operations that access the NVM media 124, such as data migration, garbage collection, wear leveling, and/or the like. To implement the internal tasks 340, the translation layer 140 may generate internal I/Os for storage media access, which may then be performed as corresponding media I/Os 326 for storage media access through the media command manager 314.

In this example, the firmware 302 of the NVM controller 126 may further comprise and/or implement a device-level management component to manage device-level aspects of the NVM media 124 (not shown in FIG. 3 to avoid obscuring details of the illustrated aspects); in some aspects, the device-level management component may comprise and/or be implemented by an internal task 340 of the translation layer 140. By way of non-limiting example, the device-level management component may monitor or manage parameters of individual ones of the NAND flash devices 204, NAND channels, memory chips, memory dies, physical memory blocks, or the like. In some cases, the device-level management 330 component monitors temperature conditions of the NVM media 124 (e.g., die or device temperature) and implements thermal control (e.g., throttling) based on a predefined or adaptive temperature threshold. For example, the device-level management component may delay or restrict access to a specific NAND device or NAND channel in response to a temperature of the NAND device or NAND channel exceeding the temperature threshold. Alternatively or additionally, the device-level management component may implement similar forms of power management (e.g., consumption-based) or other device-level monitoring and control of the NVM media 124.

As disclosed above, the translation layer 140 may be configured to process and/or schedule the host I/Os 316, which may comprise generating corresponding media I/Os 326 configured to processing by the media command manager 314. Processing the host I/Os 316 by the translation layer 140 may comprise implementing logical-physical translation operations to, inter alia, translate logical addresses of the host I/Os 316 to physical addresses for the media I/Os 326. The translation operations may include operations to retrieve, update, and/or record entries 252 comprising logical-physical translation metadata pertaining to respective logical addresses. The translation layer 140 may be configured to maintain FTL metadata 150 pertaining to the NVM media 124 within persistent storage, as disclosed herein (e.g., within the NVM media 124). The FTL metadata 150 may comprise a plurality of FTL pages 254 (e.g., FTL pages 254A-P), each FTL page 254 comprising logical-physical translation metadata pertaining to a respective group of logical addresses. In some aspects, the translation layer 140 is configured to distribute logical addresses (and/or entries 252 pertaining to the logical addresses) between the plurality of FTL pages 254 in accordance with a persistent distribution scheme. The persistent distribution scheme may comprise configuring each FTL page 254 to cover a respective extent of logical addresses (e.g., a respective contiguous range of X logical addresses, such that each FTL page 254 is configured for storage of X entries 252A-X). The disclosure is not limited in this regard, however, and could be adapted to distribute logical addresses (and/or corresponding entries 252) between FTL pages 254 in accordance with any suitable scheme. In one aspect, the translation layer 140 may be configured to distribute entries 252 within respective FTL pages 254 in accordance with the cache distribution scheme (e.g., based hash values, codes, digests, and/or signatures derived from the logical addresses).

The translation layer 140 may comprise and/or be coupled to a cache manager 160, which may be configured to improve translation performance by, inter alia, caching portions of the FTL metadata 150 within the cache 260. As disclosed above, the cache 260 may comprise memory resources of the NVM system 114, NVM controller 126, and/or the like. The cache manager 160 may be configured to divide the cache 260 into a plurality of segments 264, each segment 264 comprising respective cache memory (a respective memory buffer, memory segment, sub-segment, and/or the like). The cache manager 160 may comprise and/or be coupled to an indexer 364. The indexer 364 may be configured to assign translation entries 252 pertaining to a non-volatile memory device (e.g., NVM system 114, SSD 202, NVM media 124, or the like) to respective segments 264 of a cache 260 comprising a plurality of segments 264 based on hash values of logical addresses of the translation entries 252. The indexer 364 may be configured to assign logical addresses (and/or entries 252 pertaining to the logical addresses) to segments 264 of the cache in accordance with a cache distribution scheme. The indexer 364 may be configured to implement segment assignments having low, fixed latency that are configured to, inter alia, balance the distribution of logical addresses (and/or corresponding entries 252) between segments 264 of the cache 260.

In FIG. 3, the indexer 364 is configured to assign logical addresses based on a hash function implemented by, inter alia, a hash generator 365. The hash generator 365 may be configured to derive hash output data from logical addresses in accordance with a determined hash function. The hash output data may comprise a hash code, hash value, digest, signature, and/or the like. The hash function implemented by the hash generator 365 may comprise any suitable hash function, including, but not limited to: a cyclic redundancy check function, a checksum function, a non-cryptographic hash function, a cryptographic hash function, a keyed cryptographic hash function, an unkeyed cryptographic hash function, a universal hash function, a Rabin fingerprint, a tabulation hashing, a universal one-way has function, a Zobrist hashing, a Pearson hashing, a Buzhash, a Fowler-Noll-Vol hash function, a Jenkins hash function, a SHA hash function (e.g., SHA-1, SHA-3, SHA-224, SHA-384, SHA-512, or the like), an MD hash function (e.g., MD2, MD4, MD5, MD6, or the like), a RIPEMD hash function (e.g., RIPEMD, RIPEMD-128, RIPEMD-160, or the like), a BLAKE hash function (e.g., BLAKE2s, BLAKE2b, BLAKE2X, BLAKE3, BLAKE-256, BLAKE-512, or the like), an ECOH hash function, an FSB hash function, and/or the like. In some aspects, the hash generator 365 is configured to produce hash output data corresponding to range of values, each value of the range corresponding to a respective one of the segments 264 of the cache 260 (or a respective one of a plurality of primary segments 264A-M); the hash output data produced by the hash generator 365 may comprise an index into the segments 264 and, as such, may be referred to as indexes, index values, segment indexes, segment index values, or the like. Assigning a logical address to a segment 264 of the cache 260 may comprise deriving a segment index from the logical address by use of the hash generator 365 and using the segment index to map the logical address to a corresponding segment 264 of the cache 260.

The cache manager 160 may further comprise and/or be coupled to a search engine 362. The search engine 362 may be configured to implement search operations within respective segments 264 of the cache 260, as disclosed herein. In the FIG. 3 example, the search engine 362 comprises and/or is implemented by hardware 304 of the NVM controller 126. The search engine 362 may be configured to implement standard, unmasked search operations within respective segments 264. As used herein, a "standard" or "unmasked" search operation refers to an operation to identify an entry 252 within a segment 264 of the cache 260 that matches a target logical address (an "unmasked" target logical address). An unmasked search operation may comprise comparing respective regions of an unmasked search pattern (or unmasked target logical addresses) to corresponding regions of logical addresses of one or more entries 252. A matching entry 252 of an unmasked search operation may, therefore, comprise an entry 252 having a logical address matching an unmasked target logical address (matches each region of the target logical address).

The cache manager 160 may be configured to retrieve entries 252 from the cache 260 in response to, inter alia, translation operations being implemented by the translation layer 140 (e.g., in response to requests from the translation layer 140). Retrieving an entry 252 pertaining to a logical address may comprise the cache manager 160 deriving a segment index from the logical address by use of the hash generator 365 and configuring the search engine 362 to implement an unmasked search for an entry 252 matching the logical address within the indexed segment 264. The search engine 362 may be configured to return the matching entry 252 and/or physical address of the matching entry 252 to the translation layer 140. The cache manager 160 may be further configured to insert and/or admit entries 252 into the cache 260 in response to translation operations. Inserting an entry 252 may comprise deriving a segment index from the logical address of the entry 252 (by use of the indexer 364) and caching the entry 252 within the corresponding segment 264.

As disclosed herein, in some aspects, the cache manager 160 is configured to divide the cache 260 into a plurality of primary segments 264A-M and a secondary segment 264 (segment 264N). The indexer 364 may be configured to assign logical addresses (and/or corresponding entries 252) to respective primary segments 264A-M. The cache manager 160 may use the secondary segment 264N to cache entries 252 that cannot be cached within the primary segments 264A-M (e.g., due to availability of free cache blocks 262). To retrieve an entry 252 for a logical address, the cache manager 160 may be configured to a) index the logical address to one of the primary segments 264A-M (by use of the indexer 362) and b) configure the search engine 362 to perform an unmasked search within the indexed one of the primary segments 264A-M. The cache manager 160 may be further configured to search the secondary segment 264N for a matching entry 252. The cache manager 160 may search the secondary segment 264N in response to a cache miss within the indexed one of the primary segments 264A-M. Alternatively, the cache manager 160 may configure the search engine 362 to perform unmasked searches within the secondary segment 264N and the indexed one of the primary segments 264A-M at least partially in parallel. Inserting an entry 252 into the cache 260 may comprise the cache manager 160 indexing the entry 252 to one of the primary segments 264A-M and caching the entry 252 within one of the indexed the primary segments 264A-M and the secondary segment 264. The entry 252 may be cached within the secondary segment 264N in response to the cache manager 160 determining that the indexed one of the primary segments 264A-M is unable to cache the entry 252, as disclosed herein (e.g., due to lack of available cache blocks 262).

The search engine 362 may be further configured to implement masked search operations, which may comprise searching respective segments 264 of the cache 260 with a masked target logical address. As disclosed above, a masked search operation refers to a search operation configured to match entries 252 having logical addresses within a group of a plurality of logical addresses (e.g., match entries 252 within a contiguous range of logical addresses). Implementing a masked search operation within a segment 264 of the cache 260 may comprise comparing a subset of the regions of a target logical address to corresponding regions of logical address of entries 252 cached within the segment 264. As disclosed above, a region of a logical address (or logical address region) refers to a portion of the logical address, such as particular bits of the logical address (e.g., low-order bits, high-order bits, bits at specified indexes and/or ranges, and/or the like). Implementing a masked search operation may comprise ignoring one or more masked regions of the target logical address (and/or search pattern), which may comprise comparing logical addresses of one or more entries 252 stored within a segment 264 of the cache 260 to a masked target logical address (or masked search pattern). Ignoring a region of a target logical address or search pattern (a masked logical address or search pattern) may comprise treating the region as a matching region regardless of the contents thereof (and/or ignoring mismatches within the masked region).

The cache manager 160 may be configured to leverage masked search functionality of the search engine 362 to, inter alia, improve the efficiency of flush and/or write-back operations. As disclosed above, a flush operation may comprise transferring entries 252 from the cache 260 to FTL metadata 150 maintained in persistent storage (e.g., the NVM media 124). The cache manager 160 may be configured to implement flush operations to update respective portions of the FTL metadata 150 and/or entries 252 pertaining to respective logical addresses (e.g., respective groups, sets, collections, ranges, extents, and/or the like). The cache manager 160 may be configured to implement flush operations pertaining to respective FTL pages 254 of the FTL metadata 150 (page flush operations). As disclosed herein, each FTL page 254 of the FTL metadata 150 may be configured to cover a respective group of logical addresses (e.g., a respective logical address extent). Accordingly, a page flush operation may comprise flushing entries 252 pertaining to a group of logical addresses (the group of logical addresses covered by a particular FTL page 254 of the FTL metadata 150). Flushing to an FTL page 254 may comprise the cache manager 160 identifying entries 252 pertaining to the FTL page 254 within the cache 260 and updating the FTL page 254 with the identified entries 252 (e.g., storing the updated FTL page 254 in persistent storage). A page flush operation may, therefore, be referred to as an update operation (or page update operation). Identifying entries 252 pertaining to an FTL page 254 that covers a group of logical addresses may comprise the cache manager 160 searching the cache 260 for entries 252 having logical addresses matching any of the logical addresses of the group. Updating an FTL page 254 that covers a group comprising X logical addresses may, therefore, comprise X search operations within the cache 260 (or X·N segment search operations, where N is the number of segments 264 comprising the cache). As disclosed herein, the search engine 362 may be configured to implement masked search operations, which may be configured to match entries 252 having logical addresses within a group of logical address (e.g., match entries 252 with logical addresses included in and/or covered by the group of logical addresses). A masked search operation may be configured to match entries 252 having logical addresses covered by a particular FTL page 254. The cache manager 160 may identify entries 252 that correspond to an FTL page 254 by, inter alia, configuring the search engine 362 to implement masked search operations within the cache 260 (and/or within respective segments 264), each masked search operation configured to match and/or identify cached entries 252 having logical addresses corresponding to any of the X logical addresses covered by the FTL page 254; each masked search operation may, therefore, replace X standard, unmasked search operations (e.g., may reduce the number of search operations involved in flushing the FTL page 254 by a factor of X).

Figure 4:
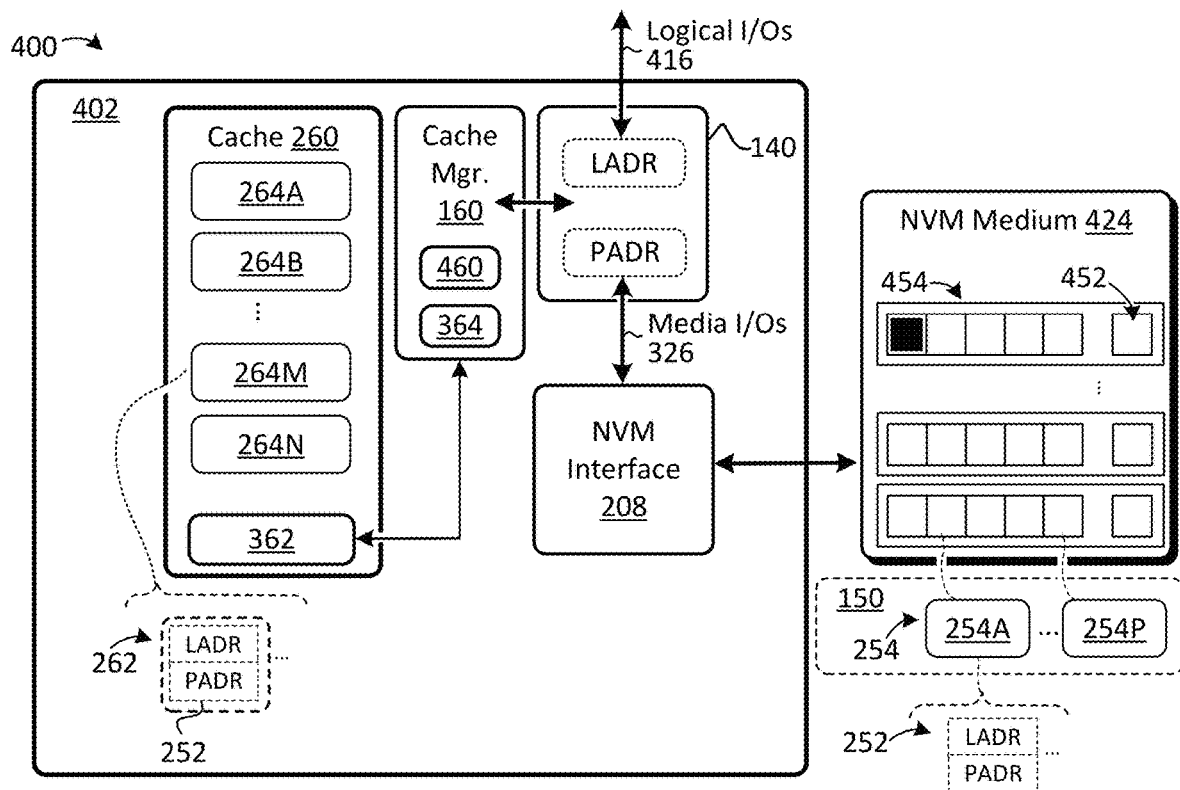
FIG. 4 illustrates example configurations of an apparatus for managing logical-physical translation metadata by an NVM system, such as the NVM system illustrated in FIG. 1.

FIG. 4 illustrates at 400 further example configurations of various hardware and firmware components for the efficient management and/or caching of logical-physical translation metadata by an NVM system, such as the NVM system 114 illustrated in FIG. 1, as disclosed herein. FIG. 4 depicts aspects of an apparatus 402 configured to manage NVM media 124, such as an NVM device (e.g., NAND Flash device 204), NVM package, NVM die, NVM core, and/or the like. In the FIG. 4 example, the apparatus 402 is coupled to an NVM medium 424, which may comprise and/or be implemented by any suitable non-volatile memory and/or storage medium. The NVM medium 424 may be configured to store data (e.g., user data) within respective physical storage units 452 (e.g., physical storage locations, such as physical pages, blocks, divisions, sectors, and/or the like), each physical storage unit 452 having a respective physical address. The physical storage units 452 may be disposed and/or implemented within respective divisions 454, each division 454 comprising physical storage units 452 capable of being managed as a group (e.g., erased as a group). In some aspects, the divisions 454 may comprise erase blocks of the NVM medium 424. Although FIG. 4 shows the apparatus 402 coupled to a single NVM medium 424 having a particular configuration (physical storage units 452 within respective divisions 454), the disclosure is not limited in this regard, the apparatus 402 may be configured to couple with a plurality of different NVM media 124 and/or NVM devices.

In some aspects, the apparatus 402 comprises a translation layer 140, cache manager 160, cache 260, and NVM interface 208. The translation layer 140 may be configured to receive logical I/Os 416 (e.g., through an I/O interface). As used herein, a logical I/O 416 refers to a command, request, directive, and/or other means for providing access to NVM services (e.g., access NVM resources, such as the NVM medium 424) in reference to logical addresses of a logical address space. In some aspects, a logical I/O 416 may comprise and/or correspond to a host I/O 316, as disclosed above. The translation layer 140 may be configured to process logical I/Os 416, which may comprise maintaining logical-physical translation metadata (FTL metadata 150) that include logical-physical translations pertaining to logical addresses of the logical I/Os 416. The FTL metadata 150 may comprise entries 252 configured to associate logical addresses with physical addresses of physical storage units 425 of the NVM medium 424, the entries 252 stored within respective persistent storage units (FTL pages 254), as disclosed herein. Processing logical I/Os 416 may further comprise dispatching media I/Os 326 corresponding to the logical I/Os 416, the media I/O 326 comprising and/or referencing physical addresses corresponding to logical addresses of the logical I/Os 416. The NVM interface 208 may be configured to process media I/O 326, as disclosed herein (e.g., access the NVM medium 424, read data from specified physical addresses, write data to selected physical addresses, and so on). The NVM interface 208 may be further configured to return information pertaining to the media I/O 326 (e.g., return data retrieved from one or more physical storage units 452). In response to a media I/O 326 to write data pertaining to a particular logical address on the NVM medium 424, the NVM interface 208 may be configured to write the data on a selected physical storage unit 452 (e.g., in accordance with an out-of-place or write-anywhere scheme) and acknowledge completion of the media I/O 326. The NVM interface 208 may be further configured to provide the translation layer 140 with the physical address at which the data were written (the physical address of the selected physical storage unit 452). In response, the translation layer 140 may record logical-physical translation metadata to associate the particular logical address with the physical address (e.g., an entry 252). The recording may comprise the cache manager 160 admitting a new entry 252 comprising the logical-physical translation metadata into the cache 260. As disclosed in further detail herein, the cache manager 160 may be further configured to record a dirty indication corresponding to the new entry 252 (e.g., in a dirty map 460 or the like).

The translation layer 140 may comprise and/or be coupled to a cache manager 160 configured to, inter alia, cache portions of the FTL metadata 150 within a cache 260, as disclosed herein. The cache 260 may comprise and/or be implemented by memory resources of the apparatus 402 (e.g., may comprise on-board, on-die, on-package, SoC, and/or on-chip memory). Alternatively, or in addition, the cache 260 may comprise and/or be implemented by memory resources of one or more other components, such as a host (e.g., a HMB, not shown in FIG. 4 to avoid obscuring details of the illustrated aspects). The cache manager 160 may be configured to divide the cache 260 into a plurality of segments 264. In some aspects, the cache manager 160 divides the cache 260 into a plurality of primary segments 264A-M and a secondary segment 264N. The cache manager 160 may be configured to index the segments 264 (and/or the primary segments 264A-M) by logical address. In some aspects, the cache manager 160 comprises and/or is coupled to an indexer 364 configured to, inter alia, derive segment indexes from logical addresses in accordance with a cache distribution scheme. The cache distribution scheme may be configured to produce segment indexes and/or segment assignments at a fixed, low latency. The cache distribution scheme implemented by the indexer 364 may be further configured to uniformly distribute logical addresses (and/or corresponding entries 252) across the plurality of segments 264 (primary segments 264A-M) such that the distribution of logical addresses (and/or corresponding entries 252) is substantially balanced. The indexer 364 may be configured to balance the logical address distribution without producing variable assignment latencies (e.g., without balancing operations having variable complexity based on, inter alia, the size of the respective segments 264). The cache distribution scheme implemented by the indexer 364 may comprise a hash distribution scheme as disclosed herein (e.g., may comprise indexing the segments 264 by hash output data derived from the logical addresses).

The cache manager 160 may further comprise and/or be coupled to a search engine 362 configured to, inter alia, implement search operations within respective segments 264 of the cache 260. The search engine 362 may be configured to implement unmasked search operations configured to identify entries 252 that match specified target logical addresses. The search engine 362 may be further configured to implement masked search operations configured to identify entries 252 that match a masked search pattern (a masked target logical address). The masked search pattern may be configured to match entries 252 having logical addresses within a particular group of logical addresses, as disclosed herein (e.g., identify entries 252 corresponding to a particular FTL page 254).

In some aspects, the cache manager 160 is further configured to admit entries 252 into the cache 260 and/or modify existing entries 252 in response to translation operations implemented by the translation layer 140 (e.g., in response to the translation layer 140 processing logical I/Os 416, the NVM interface 208 processing corresponding media I/Os 326, and/or the like). In response to a command to write user data to a particular logical address, the translation layer 140 may be configured to record logical-physical metadata to associate the particular logical address with the physical address of the physical storage unit 452 at which the user data were stored. The recording may comprise causing the cache manager 160 to insert an entry 252 that includes the logical-physical translation metadata into the cache 260 (and/or updating an existing entry 252 retrieved from the cache 260). The recording may further comprise marking the entry 252 as dirty (recording an indication that the entry 252 must be written back to persistent storage before being evicted from the cache 260). Alternatively, or in addition, dirty indications may be recorded in a dirty map 460. The dirty map 460 may comprise a data structure, such as a map, index, table, and/or the like. The cache manager 160 may be configured to maintain the dirty map 460 in the cache 260 and/or other memory resources (e.g., a register, SRAM 214, DRAM 218, an HMB 220 and/or the like). In one aspect, the dirty map 460 may be configured to indicate whether respective entries 252 within the cache 260 are dirty (e.g., may comprise a dirty flag or bit for respective entries 252 within the cache 260). Alternatively, or in addition, the dirty map 460 may comprise dirty flags corresponding to respective portions of the FTL metadata 150 (e.g., indicate whether the cache 260 comprises entries 252 to be flushed to the respective portions of the FTL metadata 150).

In the FIG. 4 example, the dirty map 460 may comprise dirty flags corresponding to respective FTL pages 254 (dirty-page flags); the dirty map 460 may comprise P dirty flags (P dirty bits), each configured to indicate a status of a respective one of FTL pages 254A-P. The dirty flag of an FTL page 254 may indicate whether the cache 260 comprises entries 252 to be flushed to the FTL page 254. The dirty map 460 may, therefore, identify FTL pages 254 to be updated in cache flush and/or update operations, as disclosed herein. In some aspects, the dirty map 460 may be configured to track a number of dirty entries 252 of respective FTL pages 254; the dirty map 460 may comprise dirty counts for respective FTL pages 254, each indicating a number of entries 252 to be flushed to the FTL page 254. The cache manager 160 may be configured to flag an FTL page 254 in the dirty map 460 (and/or increment a dirty count of the FTL page 254) in response to one or more of: admitting and/or inserting an entry 252 covered by the FTL page 254 into the cache 260, modifying an entry 252 covered by the FTL page 254 within the cache 260, and/or other operations that may result in modifying an entry 252 and/or other logical-physical translation metadata pertaining a logical address covered by the FTL page 254.

The cache manager 160 may be configured to implement background flush and/or write-back operations based on, inter alia, the dirty map 460. The cache manager 160 may be configured to identify dirty FTL pages 254 based on the dirty map 460 (based on dirty indicators and/or dirty counts of respective FTL pages 254 maintained in the 460) and implement (or schedule) operations to update the dirty FTL pages 254 in one or more background flush operations. The cache manager 160 may be configured to select FTL pages 254 for update operations based on any suitable criteria, such as dirty counts of the FTL pages 254 (FTL pages 254 with higher dirty counts may be selected before FTL pages 254 having lower dirty counts), least recently flushed metrics (a time since respective FTL pages 254 were updated), NVM management operations, and/or the like. In some aspects, the cache manager 160 is configured to coordinate flush and/or update operations with NVM management operations pertaining to the NVM medium 424. As used herein, an NVM management operation refers to an operation pertaining to physical storage units 452 of the NVM medium 424 and/or relocation or reprogramming on data on physical storage units 452 on the NVM medium 424, which may include, but are not limited to: erase operations, programming operations, reprogram operations, data relocation operations, data refresh operations, garbage collection, consolidation operations, compaction operations, refresh operations, health management operations, error management operations, and/or the like. NVM management operations may be implemented by the translation layer 140, NVM interface 208, and/or the like (e.g., the translation layer 140 may direct the NVM interface 208 to implement NVM management operations on the NVM medium 424). The cache manager 160 may be configured to implement flush and/or update operations pertaining to an FTL page 254 in response to and/or during implementation of an NVM management operation pertaining to physical storage units 452 on which the FTL page 254 is stored. Implementing cache flush and/or update operations during NVM management operations may reduce cache management overhead; NVM write operations to update respective FTL pages 254 may leverage write operations of the NVM management operations (as opposed to being implemented in separate NVM write operations). Moreover, updating FTL pages 254 during NVM management operations may reduce the rate at which garbage collection are performed (prevent accumulation of obsolete FTL mapping data on the NVM medium 424).

As disclosed herein, to implement a flush operation to update a selected FTL page 254 (a page update operation) the cache manager 160 may be configured to: a) identify entries 252 pertaining to the selected FTL page 254 within the cache 260 and b) updating the selected FTL page 254 with the identified entries 252. The updating may comprise modifying the selected FTL page 254 to incorporate the identified entries 252 (e.g., overwriting existing entries 252 of the selected FTL page 254 with the identified entries 252) and writing the modified FTL page 254 to one or more physical storage units 452 of the NVM medium 424. Flushing the cache 260 to the selected FTL page 254 during an NVM management operation pertaining to first physical storage units 452 on which the selected FTL page 254 is stored (e.g., garbage collection) may comprise reading the selected FTL page 254 from a first physical storage unit 452 (e.g., as part of the NVM management operation in preparation for, inter alia, erasing the division 454 comprising the first physical storage unit 452), updating the selected FTL page 254 with the identified entries 252, and storing the updated FTL page 254 on the NVM medium 424. The updated FTL page 254 may be stored on the first physical storage unit 452 as part of the NVM management operation (e.g., in response to erasing the division 454 comprising the first physical storage unit 452 and/or reprogramming data thereto). Alternatively, the updated FTL page 254 may be stored at another physical storage unit 452 and/or other division 454 (e.g., in accordance with an out-of-place or write-anywhere scheme).

The cache manager 160 may be further configured to clear the dirty flag of the selected FTL page 254 in the dirty map 460 in response to completing the flush operation (e.g., in response to storing the updated FTL page 254 on the NVM medium 424). Clearing the dirty flag of an FTL page 254 may comprise setting the dirty flag to indicate that the FTL page 254 is clean (e.g., not dirty and/or has a dirty count of 0). An operation to flush the cache 260 (a cache flush or full flush operation) may comprise implementing a page flush operation for each dirty FTL page 254. The cache manager 160 may be configured to implement a cache flush operation in response to a shutdown event or other trigger (and/or transitioning to a low-power state). In some aspects, the cache manager 160 is further configured to implement background flush operations. The cache manager 160 may be configured to implement background flush operations in accordance with a periodic schedule (at determined time intervals), in response to one or more flush criteria (e.g., in response to one or more dirty thresholds), and/or the like. A background flush operation may comprise a flush operation implemented outside of the critical path of I/O requests (e.g., outside of the critical path of logical I/Os 416 and/or corresponding media I/Os 326). The cache manager 160 may be configured to prevent background flush operations from impacting performance. The cache manager 160 may be configured to implement background flush operations during idle periods (e.g., times during which the translation layer 140 is not processing logical I/Os 416 and/or the NVM interface 208 is not processing media I/Os 326), and may be configured to terminate and/or pause background flush operations otherwise (e.g., the cache manager 160 may be configured to pause a flush operation in response to receiving a logical I/Os 416 for processing).

Figure 5A:
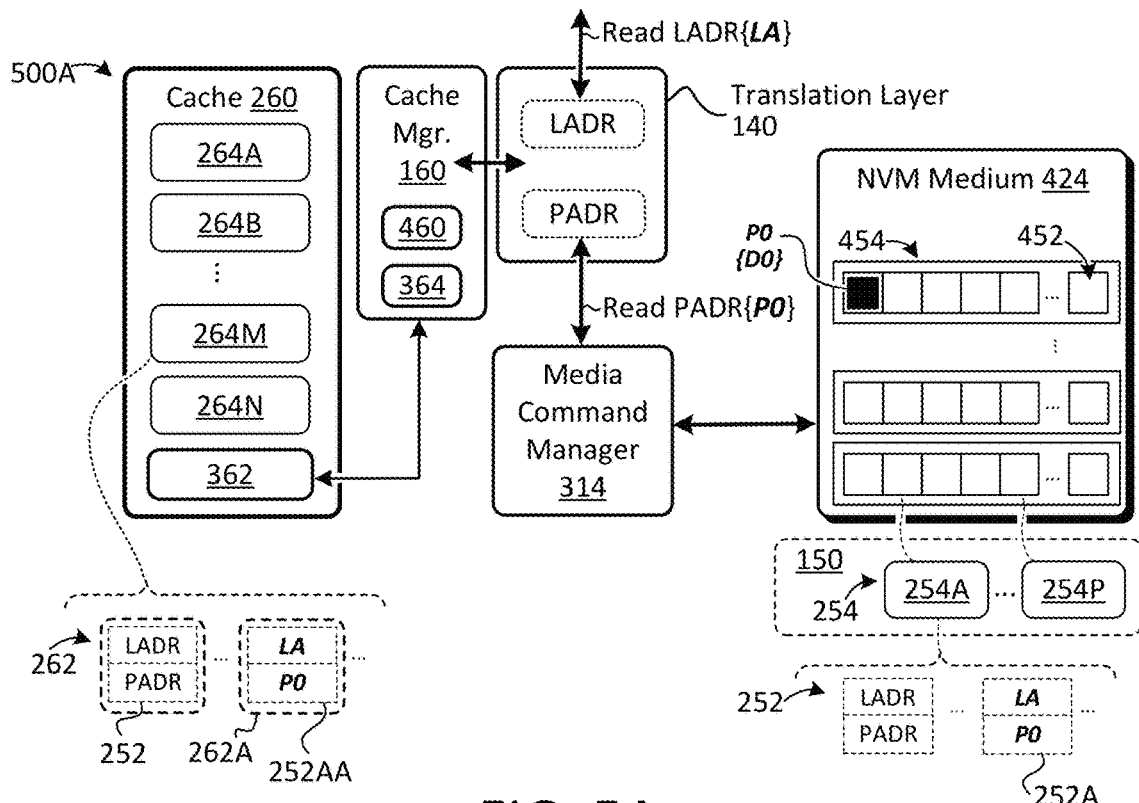
FIGS. 5A-5C illustrate examples of logical-physical translation metadata management implemented by aspects of an NVM controller such as the NVM controller illustrated in FIG. 2.
Figure 5B:
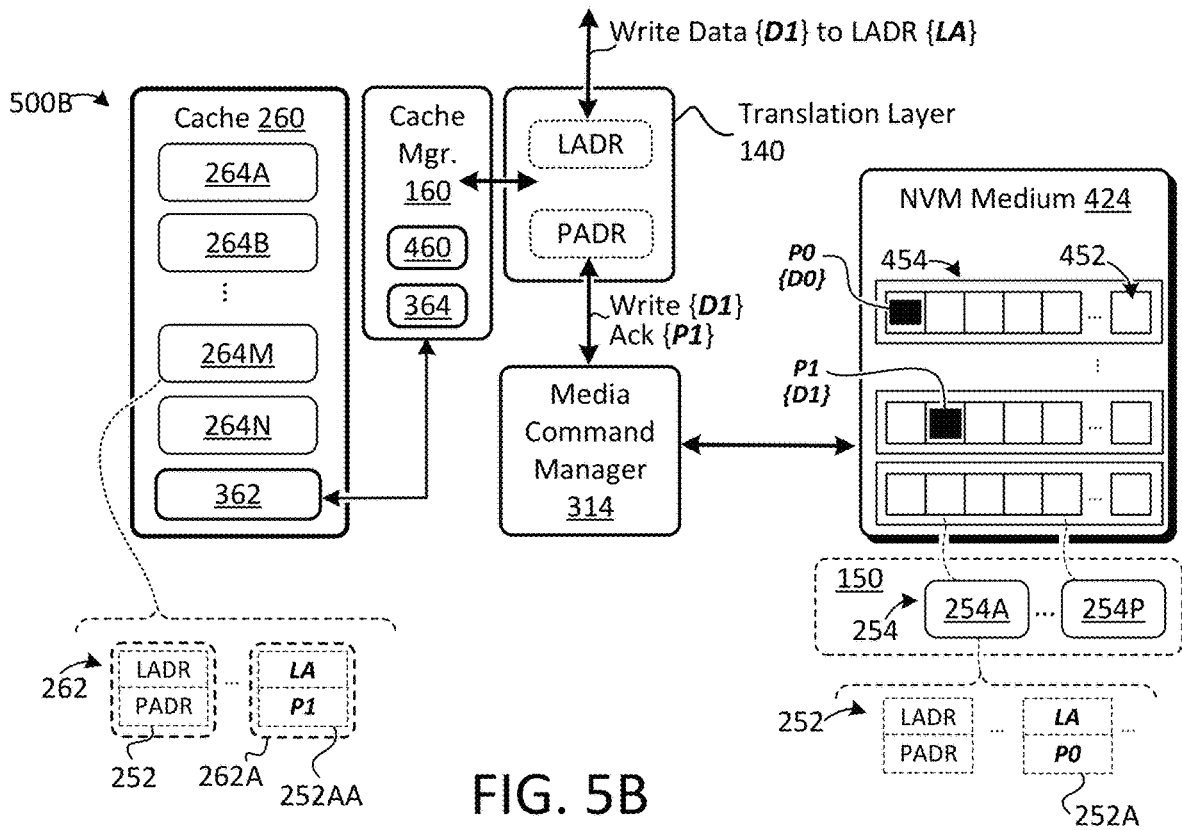
Figure 5C:
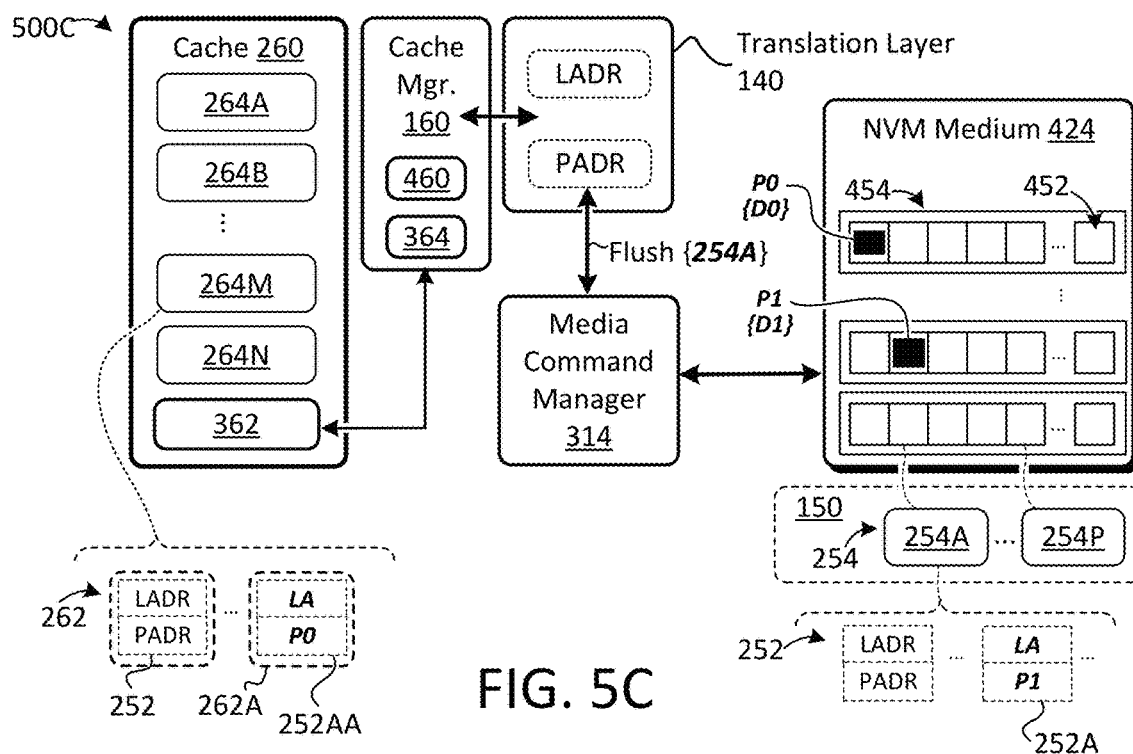

FIGS. 5A-C illustrate examples of logical-physical translation metadata management implemented by aspects of the translation layer 140 and cache manager 160 of an NVM controller, such as the NVM controller 126 illustrated in FIG. 1. In various aspects, the translation layer 140, cache manager 160, cache 260, and/or media command manager 314 of FIGS. 5A-C may comprise and/or be implemented by components, firmware 302, and/or hardware 304 of an NVM system 114, NVM controller 126, SSD 202, and/or apparatus 402, as disclosed herein.

The translation layer 140 may be configured to, inter alia, implement logical-physical translation functionality pertaining to an NVM medium 424 (maintain FTL metadata 150 comprising one or more FTL pages 254 within persistent storage, such as the NVM medium 424) and the cache manager 160 may be configured to cache portions of the FTL metadata 150 within a cache 260, as disclosed herein. The translation layer 140 may be configured to process I/O requests, such as logical I/Os 416, host I/Os 316, and/or the like. Processing the I/O requests may comprise translating logical addresses of the I/O requests to corresponding physical addresses of the NVM medium 424. The processing may comprise generating media I/Os 326 corresponding to the I/O requests, which may be implemented by the media command manager 314 (and/or NVM interface 208), as disclosed herein.

The cache manager 160 may be configured to divide the cache 260 into a plurality of segments 264 and the indexer 364 may be configured to index the segments 264 by logical address (e.g., assign logical addresses and/or corresponding entries 252 to respective segments 264 such that the distribution thereof between the segments 264 is substantially balanced). In some aspects, the cache 260 comprises a plurality of primary segments 264A-M and a secondary segment 264N. The indexer 364 may be configured to distribute logical addresses and/or entries 252 in accordance with a cache distribution scheme, which may comprise, inter alia, a hash indexing scheme, as disclosed herein. A search engine 362 may be configured to implement search operations within respective segments 264 of the cache 260. The search engine 362 may be configured to implement unmasked search operations configured to match entries 252 to specified logical addresses and masked search operations configured to match entries 252 to groups of logical addresses, as disclosed herein.

The translation layer 140 may be configured to implement translation operations by use of the cache 260 (and/or cache manager 160), which operations may include, but are not limited to: admitting and/or inserting logical-physical translation metadata into the cache 260 (admitting and/or inserting entries 252 into the cache 260 in accordance with a cache admission policy), retrieving logical-physical translation metadata from the cache 260 (retrieving entries 252 corresponding to specified I/O requests and/or logical addresses from the cache 260), modifying logical-physical metadata stored within the cache 260 (e.g., modifying entries 252 within the cache 260), and so on. The cache manager 160 may be further configured to implement cache management operations pertaining to the cache 260, which may include, but are not limited to: tracking a status of logical-physical metadata within the cache 260 (e.g., maintaining a dirty map 460 comprising flags indicating whether respective entries 252 are dirty, whether respective FTL pages 254 are dirty, a dirty count of respective FTL pages 254, and/or the like), removing and/or evicting logical-physical translation metadata from the cache 260 (e.g., removing and/or evicting entries 252 in accordance with an eviction policy and/or dirty flags), flushing logical-physical translation metadata from the cache 260 (e.g., flushing entries 252 to respective FTL pages 254), and so on. The cache manager 160 may be configured to reduce the overhead of flush operations by use of masked search functionality implemented by the search engine 362. To flush entries 252 corresponding to a group of logical addresses (e.g., to an FTL page 254 that covers the group of logical addresses), the cache manager 160 may configure the search engine identify entries 252 that match the group of logical addresses within respective segments 264 of the cache 260 in one or more masked search operations, each masked search operation replacing X standard, unmasked search operations (where X is the number of logical addresses included in the group).

In the example illustrated in FIG. 5A at 500A, the translation layer 140 processes an I/O request to read data pertaining to logical address LA. Processing the read request may comprise retrieving an entry 252 for logical address LA from the cache 260 (by use of the cache manager 160). The cache manager 160 may attempt to retrieve an entry 252 for logical address LA by a) indexing a segment 264 of the cache 260 by use of the indexer 364 (by hashing the logical address LA) and b) configuring the search engine 362 to search the indexed segment 264 (and/or a secondary segment 264N) for an entry 252 comprising logical address LA. In response to a cache miss, the cache manager 160 may be configured to admit an entry 252 for logical address LA into the cache 260, which may comprise retrieving the FTL page 254 that covers logical address LA from the FTL metadata 150. As illustrated in FIG. 5A, the FTL page 254A covers logical address LA and comprises an entry 252A mapping logical address LA to physical address P0 (comprising data D0). As further illustrated in FIG. 5A, the segment 264M of the cache 260 comprises an entry 252AA for logical address LA. The entry 252AA may have been admitted into the cache 260 in response to the read request (a cache miss) or may have been admitted into the cache 260 prior to the translation layer 140 processing the read request (e.g., in a prefetch operation, another data request, and/or the like).

FIG. 5B illustrates further examples of logical-physical translation metadata management implemented by aspects of the translation layer 140 and cache manager 160, as disclosed herein. FIG. 5B illustrates at 500B, processing of an I/O request to write data D1 to the logical address LA. Processing the request may comprise the translation layer 140 generating a media I/O 326 corresponding to the writes request. In response, the media command manager 314 may cause the data D1 to be written to the NVM medium 424 (e.g., in accordance with an out-of-place or write-anywhere scheme). As shown in FIG. 5B, the data D1 may be written at physical address P1. The obsolete data D0 of logical address LA stored at physical address P0 may be marked for removal from the NVM medium 424 in a background NVM management operation (e.g., in a garbage collection operation). Processing the write request may comprise the translation layer 140 updating logical-physical translation metadata for logical address LA. The translation layer 140 may update the logical-physical translation metadata in the cache 260 (by use of the cache manager 160) as opposed to writing the update to persistent storage in the critical path of the write request. As illustrated at 500B, updating the logical-physical translation metadata in response to the write request may comprise the cache manager 160 a) retrieving the entry 252AA for logical address LA from the cache 260 and b) updating the entry 252AA to associate logical address LA with physical address P1 (as opposed to physical address P0). Alternatively, the updating may comprise inserting a new entry 252 for logical address LA into the cache 260 (to replace the existing entry 252AA and/or in the event the entry 252AA for logical address LA had not yet been admitted into the cache 260). The cache manager 160 may be further configured to update the dirty map 460 to indicate that the FTL page 254A covering logical address LA is dirty and/or increment a dirty count thereof (and/or indicate that the entry 252AA is dirty). As shown in FIG. 5B, the entry 252A for logical address LA stored in FTL page 254A is inconsistent with the updated entry 252AA in the cache 260 (the dirty FTL page 254A must be updated before evicting data, such as entry 252AA from the cache 260). Processing a request to read logical address LA subsequent to the write may comprise translating logical address LA to physical address P1 based on the contents of the cache 260 (as opposed to physical address P0 as indicated by the dirty FTL page 254A of the FTL metadata 150 on persistent storage).

FIG. 5C illustrates further examples of logical-physical translation metadata management implemented by aspects of the translation layer 140 and cache manager 160, as disclosed herein. FIG. 5C illustrates at 500C, implementation of a flush operation by the translation layer 140 and/or cache manager 160. The flush operation may be implemented in a background operation, as disclosed herein (during an idle period). The flush operation may comprise a page flush operation configured to update a selected FTL page 254 (e.g., FTL page 254A). The FTL page 254A may be selected for the flush operation based on, inter alia, the dirty map 460 (e.g., in response to determining that the FTL page 254A is dirty). Alternatively, or in addition, the FTL page 254A may be selected for the flush operation in accordance with another selection criteria (e.g., dirty count, elapsed time, an NVM media management operation, and/or the like, as disclosed herein).

To implement the flush operation for FTL page 254A, the cache manager 160 is configured to identify entries 252 covered by the FTL page 254A within the cache 260 and update the FTL page 254A with the identified entries 252. To identify the entries 252 of FTL page 254A (e.g., entry 252AA), the cache manager 160 is configured to cause the search engine 362 to implement masked search operations within respective segments of 264 of the cache 260, each masked search operation configured to match entries 252 having logical addresses matching any of the logical addresses covered by the FTL page 254A. The cache manager 160 may be configured to populate a pattern buffer of the search engine 362 with a target logical address, which may be any of the logical addresses covered by the FTL page 254A (any one of the group of logical addresses of the FTL page 254A), and set mask values and/or flags of the search engine 362 to disable one or more regions of the pattern buffer and/or target logical address, as disclosed herein. The masked search operations may comprise searching respective segments 264A-N of the cache 260 with the masked search pattern (masked target logical address). In the FIG. 5C example, the masked search operations may comprise identifying entry 252AA as corresponding to the FTL page 254A (in response to the search engine 362 implementing a masked search operation within segment 264M). Updating the FTL page 254A may comprise writing the identified entries 252 (e.g., entry 252AA) to the FTL page 254A maintained on persistent storage (the NVM medium 424), e.g., writing updated portions of the FTL page 254A. Alternatively, the cache manager 160 may be configured to load the FTL page 254A from persistent storage, update the loaded FTL page 254A with the identified entries 252, and write the updated FTL page 254A back to persistent storage. As shown in FIG. 5C, the flush operation may comprise updating entry 252A of the FTL page 254A to map logical address LA to physical address P1 rather than P0 (per entry 252AA maintained in the cache 252AA). The cache manager 160 may be further configured to clear the dirty flag of the FTL page 254A in response to completing the update. In some aspects, the flush operation may further comprise evicting entry 252AA from the cache 260 (or marking the entry 252AA as being available for eviction and/or non-dirty).

Figure 6:
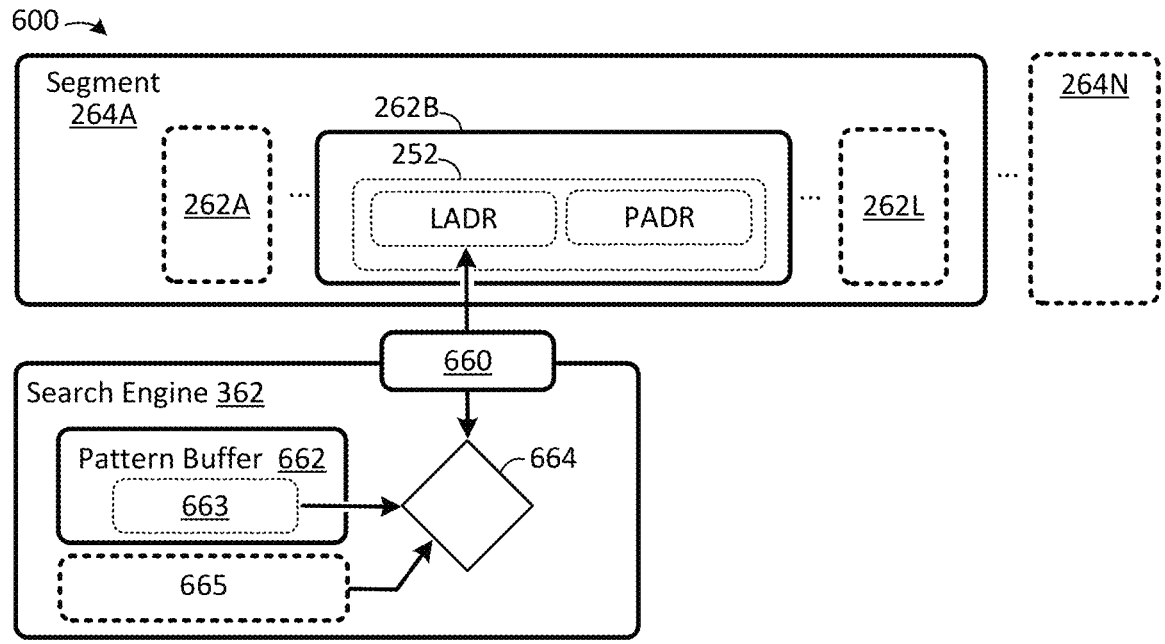
FIG. 6 illustrates examples of a search engine configured to implement search operations within respective segments configured to cache logical-physical translation metadata by an NVM controller, such as the NVM controller illustrated in FIG. 2.

FIG. 6 illustrates aspects of a cache entry search engine 362 (search engine 362) of an NVM controller, such as the NVM controller 126 illustrated in FIG. 2. The search engine 362 may comprise and/or be implemented by hardware 304 of an NVM system 114, NVM controller 126, and/or apparatus 402, as disclosed herein. The search engine 362 may comprise and/or be coupled to a router 660, which may be configured to selectively couple the search engine 362 to selected segments 264 of the cache 260. In the FIG. 6 example at 600, the router 660 is configured to couple the search engine 362 to segment 264A. In response to a request to retrieve an entry 252 for a particular logical address, the cache manager 160 may configure the search engine 362 (and/or router 660) to search the segment 264 assigned to the particular logical address (e.g., based on a cache distribution scheme implemented by the indexer 364, as disclosed herein). In some aspects, the router 660 may be further configured to couple the search engine 362 to respective cache blocks 262 of the selected segment 264. In the FIG. 6 example, the router is configured to couple the search engine 362 to the entry 252 cached within cache block 262B (of segment 264A). Searching a segment 264 of the cache 260 may comprise configuring the router 660 to couple to search engine 362 to respective cache blocks 262 (to iteratively search entries 252 cached within the cache blocks 262A-L of the segment 264). Alternatively, and as disclosed in further detail below, the search engine 362 may be configured to search a plurality of entries 252 cached within a segment 264 at least partially in parallel.

The search engine 362 may comprise configurable search criteria, which may define a search pattern for search operations implemented thereby. The search criteria may comprise a target logical address 663. In some aspects, the search engine 362 comprises a pattern buffer 662 configured to, inter alia, hold search criteria of the search engine 362, such as the target logical address 663. The pattern buffer 662 may comprise a memory, buffer, register, one or more latches, and/or the like. Configuring the search engine 362 to implement a search operation may, therefore, comprise populating the pattern buffer 662 with a suitable target logical address 663. The search engine 362 may further comprise a match component 664, which may be configured to determine whether search criteria set in the pattern buffer 662 matches the entry 252 coupled to the search engine 362 (by the router 660). As illustrated in FIG. 6, the match component 664 may be configured to compare the target logical address 663 held within the pattern buffer 662 to the logical address of the entry 252. The match component 664 may be configured to compare regions of the pattern buffer 662 to corresponding regions of the logical address (e.g., perform bit-wise comparisons) and determine whether the entry 252 matches in response to the comparing (e.g., based on comparisons within the respective regions). In an unmasked search operation, the match component 664 may determine that the entry 252 matches the target logical address 663 in response to determining that each region of the target logical address 663 (and/or pattern buffer 662) matches the corresponding region of the logical address of the entry 252.

In some aspects, the pattern buffer 662 further comprises and/or corresponds to a mask 665 (the search criteria of the search engine 362 may further comprise the mask 665). In some aspects, the mask 665 is maintained within the pattern buffer 662 (the mask 665 may be set and/or populated within the pattern buffer 662). Alternatively, the mask 665 may be held in a separate storage location (e.g., a buffer, register, one or more latches, and/or the like). The mask 665 may comprise a plurality of mask values and/or flags, each configured to selectively disable a respective region of the pattern buffer 662 (and/or target logical address 663 held therein). As disclosed herein, disabling or masking a region of the pattern buffer 662 (and/or target logical address 663) may comprise configuring the match component 664 to ignore comparisons pertaining to the disabled or masked region (treat the region as matching, regardless of the contents thereof). Configuring the search engine 362 to implement a masked search operation may, therefore, comprise populating the search criteria thereof (pattern buffer 662) with a target logical address 663 and mask 665 configured to disable one or more regions of the target logical address 663 (e.g., produce a masked target logical address and/or search pattern).

Figure 7:
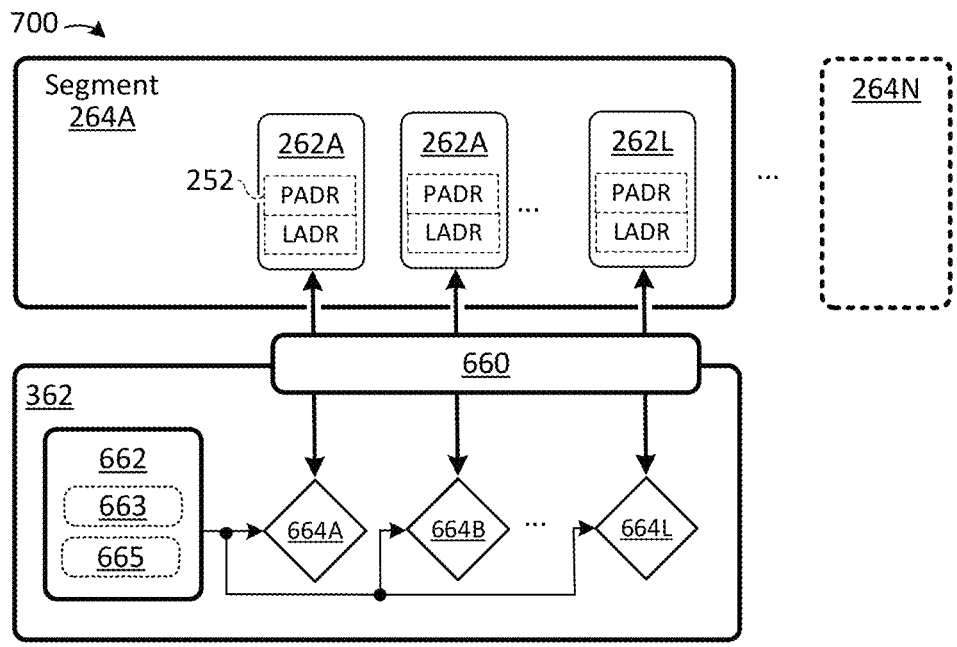
FIG. 7 illustrates examples of a search engine configured to implement search operations within respective segments at least partially in parallel by an NVM controller, such as the NVM controller illustrated in FIG. 2.

FIG. 7 illustrates further aspects of a cache entry search engine 362 (search engine 362) of an NVM controller, such as the NVM controller 126 illustrated in FIG. 2. The search engine 362 may comprise and/or be coupled to a router 660 configured to couple the search engine 362 to a selected one of a plurality of segments 264 of the cache 260, as disclosed herein (e.g., segment 264A). In the FIG. 7 example at 700, the search engine 362 comprises a plurality of match components 664, each configured to compare search criteria of the search engine 362 to a respective entry 252 cached within the selected segment 264 (e.g., match the target logical address 663 and/or mask 665 to the logical address of a respective entry 252). In one aspect, the search engine 362 may comprise L match components 664 (match components 664A-L), each configured to match the pattern buffer 662 to an entry 252 cached within a corresponding one of L cache blocks 262A-L of the selected segment 264. In some aspects, the router 660 may be configured to couple the search engine 362 to two segments 264 of the cache (e.g., a selected one of a plurality of primary segments 264A-M and the secondary segment 264N). The search engine 362 may comprise 2·L match components 664, each configured to match the pattern buffer 662 to an entry 252 cached within a cache block 262 of one of the secondary segment 264N and a selected one of the plurality of primary segments 264A-M. The search engine 362 may, therefore, be configured to search a selected one of the primary segments 264A-M and the secondary segment 264N in parallel (or at least partially in parallel). In some aspects, the search engine 362 comprises fewer match components 664 than the number of cache blocks 262 (e.g., a half, fourth, or the like). The search engine 362 may be configured to search respective segments 264 at least partially in parallel by use of the available match components 664 (in two, four, and/or other number of partially parallel search operations).

Figure 8:
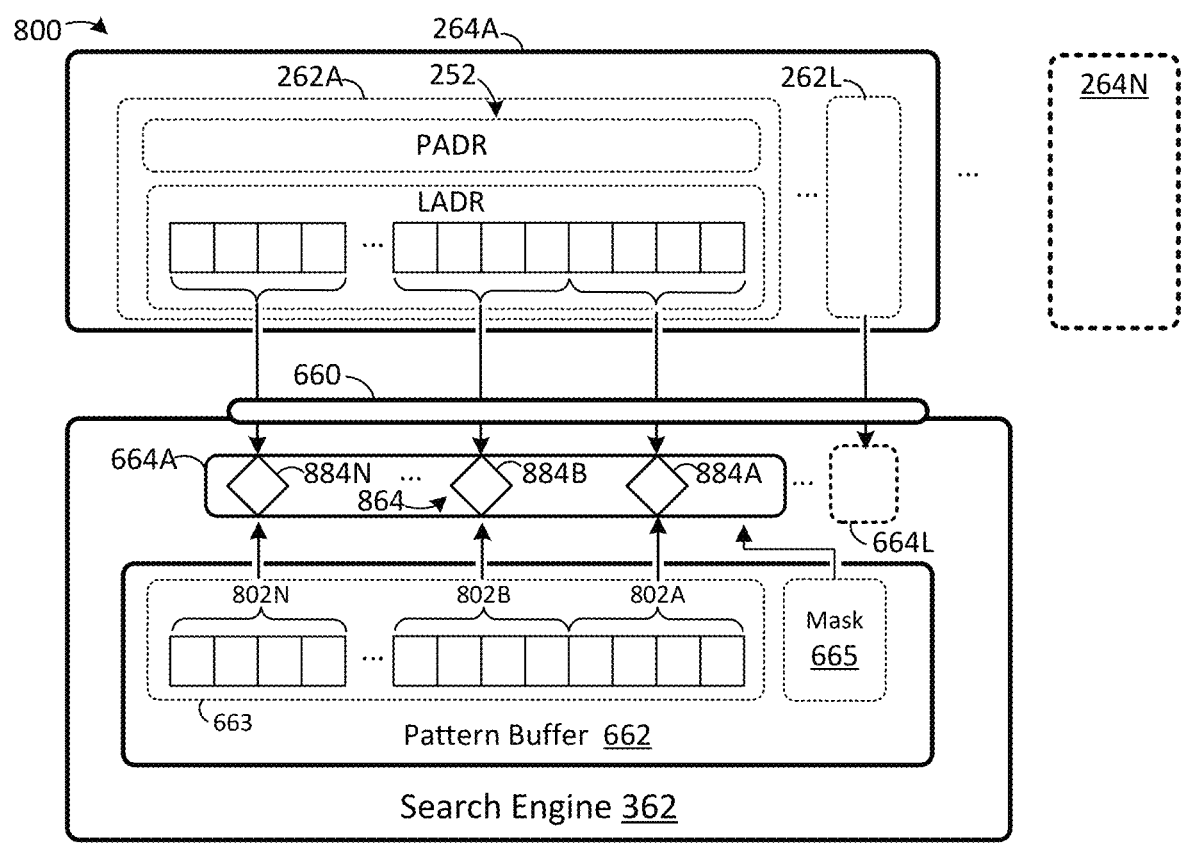
FIG. 8 depicts aspects of an example method for retrieving logical-physical translation metadata from a cache by an NVM controller, such as the NVM controller illustrated in FIG. 2.

FIG. 8 illustrates further aspects of a cache entry search engine 362 (search engine 362) of an NVM controller, such as the NVM controller 126 illustrated in FIG. 2. The search engine 362 may comprise and/or be coupled to a router 660 configured to couple the search engine 362 to a selected one of a plurality of segments 264 of the cache 260, as disclosed herein (e.g., segment 264A). The search engine 362 may comprise a plurality of match components 664, each match component 664 configured to evaluate whether the search criteria of the search engine 362 (pattern buffer 662) matches a respective entry 252 cached within the segment 264 coupled to the search engine (by the router 660). The search engine 362 may comprise match components 664A-L capable of, inter alia, searching segments 264 in parallel (or fewer match components 664 capable of searching segments 264 at least partially in parallel). In some aspects, the search engine 362 comprises Q·L match components 664 capable of searching Q segments 264 of the cache 260 in parallel.

As disclosed herein, a match component 664 may be configured to compare logical address regions 802 (regions 802) of the target logical address 663 held within the pattern buffer 662 to corresponding regions 802 of the logical address of a corresponding entry. As illustrated in FIG. 8, a match component 664 (match component 664A) may comprise a plurality of compare elements 884, each compare element 884 configured to compare a respective region 802 of the pattern buffer 662 (and/or target logical address 663 populated therein) to a corresponding region 802 of the logical address of an entry 252. In the FIG. 8 example at 800, each match component 664 comprises N compare elements 884A-N, each compare element 884A-N configured to compare a respective one of the regions 802A-N of the pattern buffer 662 (and/or target logical address 663) to a corresponding region and/or portion of the logical address of an entry 252 (where N is a suitable integer). The regions 802 may comprise to any suitable portion of a logical address, such as respective bits, collections of bits, nibbles, bytes, words, and/or the like. As illustrated in FIG. 8, region 802A may comprise a low-order logical address region, region 884B may correspond to a higher-order region 802, and region 884N may correspond to a high-order region 802 of the logical address (e.g., in accordance with a format and/or endianness of the target logical address 663 held within the pattern buffer 662 and/or logical address of the entry 252). In FIG. 8, the match components 664 may determine whether a logical address matches the search criteria based on comparisons determined by the compare elements 884 thereof (may comprise aggregating and/or logically combining outputs of compare elements 884A-N).

The search engine 362 may be further configured to implement masked search operations (and/or match entries 252 to a masked target logical address). In the FIG. 8 example, implementing a masked search operation may comprise configuring the match components 664 to ignore and/or disable one or more compare elements 884 thereof (e.g., configure the compare elements 884 to produce a match output regardless of the contents of the corresponding region 802). The mask 665 of the search criteria (held in the pattern buffer 662 and/or other storage location) may be configured to identify regions 802 to mask in a masked search operation (selectively enable or disable respective regions 802 and/or corresponding compare elements 884). Configuring the search engine 362 to implement a masked search operation may, therefore, comprise populating the pattern buffer 662 with a target logical address 663 and mask 665, the mask 665 configured to, inter alia, mask one or more regions 802 (e.g., mask or disable one or more compare elements 844). Configuring the search engine 362 to implement an unmasked search operation may comprise populating the pattern buffer 662 with a target logical address 663 and mask 665, the mask 665 configured to enable the regions 802 (and/or compare elements 864) such that none of the regions 802 and/or compare elements 864 are masked (or disabled).

Techniques of Logical-Physical Translation Metadata Management

The following discussion describes techniques of logical-physical translation metadata management. These techniques may be implemented using or embodying any of the entities described herein, such as those described with reference to FIGS. 1-8 or FIGS. 14 and 15. These techniques include methods illustrated in FIGS. 9-13, each of which is shown as a set of operations performed by one or more entities.

These methods are not necessarily limited to the orders of operations shown. Rather, any of the operations may be repeated, skipped, substituted, or re-ordered to implement various aspects described herein. Further, these methods may be used in conjunction with one another, in whole or in part, whether performed by the same entity, separate entities, or any combination thereof. In portions of the following discussion, reference will be made to the operating environment 100 of FIG. 1 and entities of FIGS. 2-8 by way of example. Such reference is not to be taken as limiting described aspects to the operating environment 100, entities, or configurations, but rather as illustrative of one of a variety of examples. Alternatively or additionally, operations of the methods may also be implemented by or with entities described with reference to systems of FIGS. 14 and/or 15.

Figure 9:
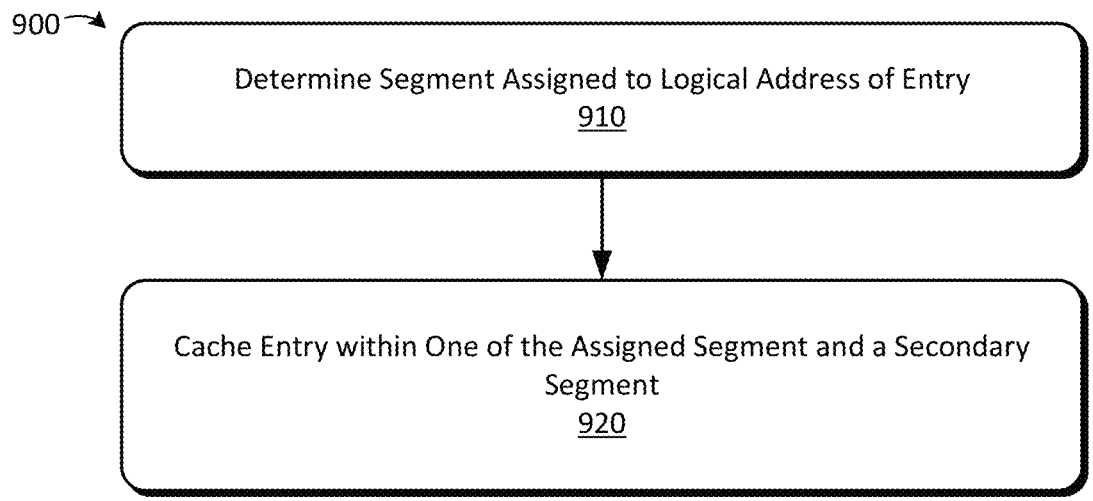
FIG. 9 depicts aspects of an example method for admitting logical-physical translation metadata into a cache by an NVM controller, such as the NVM controller illustrated in FIG. 2.

FIG. 9 depicts aspects of an example method 900 for admitting and/or inserting logical-physical translation metadata into a cache 260 (e.g., in response to a request to admit an entry 252 into the cache 260) by an NVM controller, such as the NVM controller 126 illustrated in FIG. 2. Method 900 may be implemented by aspects of the translation layer 140 and/or cache manager 160, as disclosed herein. Method 900 may be implemented in response to a request to admit logical-physical translation metadata pertaining to a logical address into the cache 260 (e.g., an entry 252 for the logical address). Step 910 may comprise determining a segment 264 of the cache 260 assigned to the entry 252 based on, inter alia, the logical address of the entry 252. Step 910 may comprise assigning the entry 252 to one of a plurality of primary segments 264A-M of the cache 260. The segment assignment of step 910 may be determined by use of the indexer 364 disclosed herein (in accordance with a cache distribution scheme). Step 910 may comprise deriving hash output data from the logical address and/or indexing the logical address to a segment 264, as disclosed herein.

Step 920 may comprise caching the entry 252 within one of the assigned segments 264 and a secondary segment 264N of the cache 260. The entry 252 may be cached within the secondary segment 264N in response to determining that the assigned segment 264 is not capable of caching the entry 252 (e.g., lacks available cache blocks 262).

Figure 10:
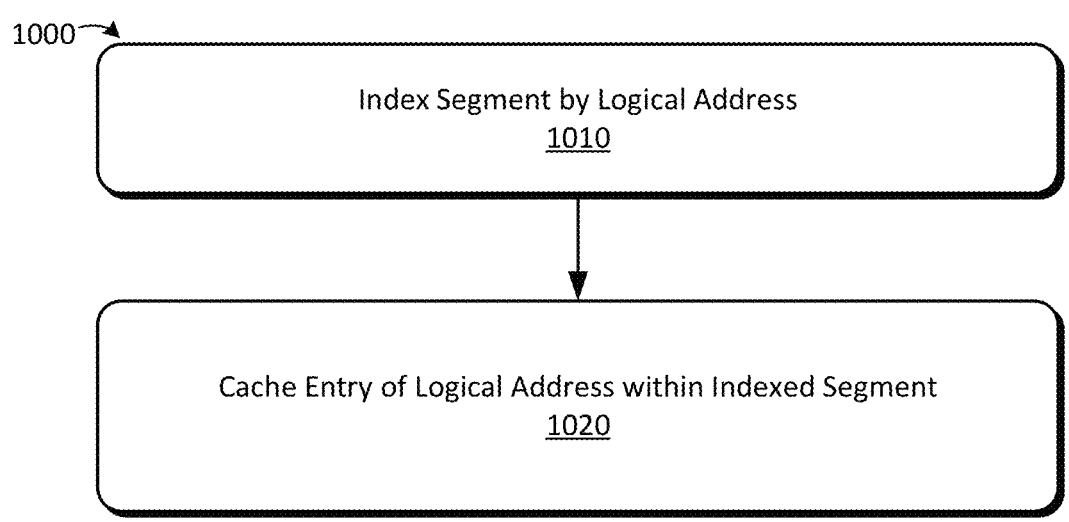
FIG. 10 depicts further aspects of an example method for retrieving logical-physical translation metadata from a cache by an NVM controller, such as the NVM controller illustrated in FIG. 2.

FIG. 10 depicts aspects of an example method 1000 for retrieving logical-physical translation metadata from a cache 260 (e.g., in response to a request to admit an entry 252 into the cache 260) by an NVM controller, such as the NVM controller 126 illustrated in FIG. 2. Method 1000 may be implemented by aspects of the translation layer 140 and/or cache manager 160, as disclosed herein. Method 1000 may be implemented in response to a request to retrieve logical-physical translation metadata pertaining to a specified logical address from the cache 260. Step 1010 may comprise indexing a segment 264 of the cache 260 by the specified logical address. Step 1010 may comprise assigning the specified logical address to one of a plurality of segments 264 of the cache 260, as disclosed herein (e.g., by use of the indexer 364). Step 1010 may comprise deriving hash output data from the specified logical address and/or using the hash output data to select one of a plurality of segments 264 (select one of a plurality of primary segments 264A-M). Step 1020 may comprise caching the entry 252 within one of the indexed segment 264 determined at step 1010 and a secondary segment 264 of the cache 260, as disclosed herein (e.g., secondary segment 264N).

Figure 11:
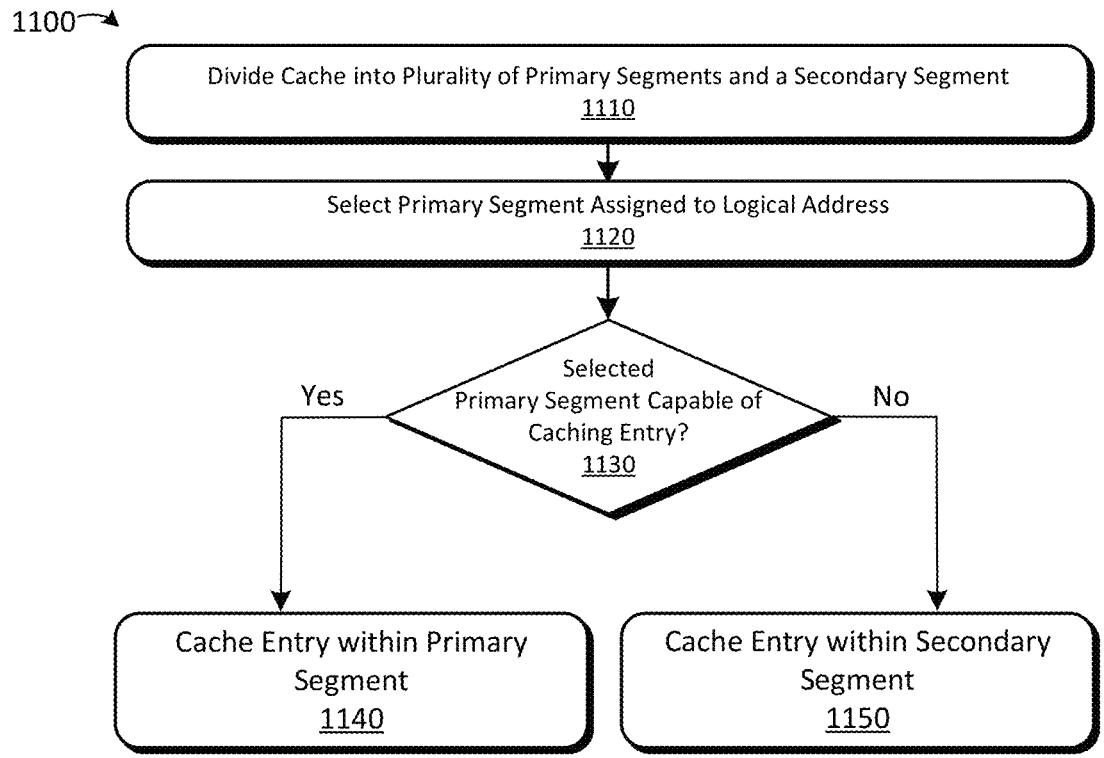
FIG. 11 depicts further aspects of an example method for admitting logical-physical translation metadata into a cache by an NVM controller, such as the NVM controller illustrated in FIG. 2.

FIG. 11 depicts further aspects of an example method 1100 for admitting and/or inserting logical-physical translation metadata into a cache 260 (e.g., in response to a request to admit an entry 252 into the cache 260) by an NVM controller, such as the NVM controller 126 illustrated in FIG. 2. Method 1100 may be implemented by aspects of the translation layer 140 and/or cache manager 160, as disclosed herein. Step 1110 may comprise dividing a cache memory (cache 260) into a plurality of segments 264, including a plurality of primary segments 264A-M and a secondary segment 264N. Step 1120 may comprise selecting one of the plurality of primary segments 264A-M for an entry 252 (e.g., in response to a request to admit the entry 252 into the cache). Step 1120 may comprise indexing a logical address of the entry 252 to one of the plurality of primary segments 264A-M, as disclosed herein (e.g., by use of the indexer 364). Step 1130 may comprise determining whether the selected one of the primary segments 264A-M is capable of caching the entry 252. Step 1140 may comprise caching the entry 252 within the selected one of the primary segments 264A-M in response to a positive determination and step 1150 may comprise caching the entry 252 within the secondary segment 264N in response to a negative determination.

Figure 12:
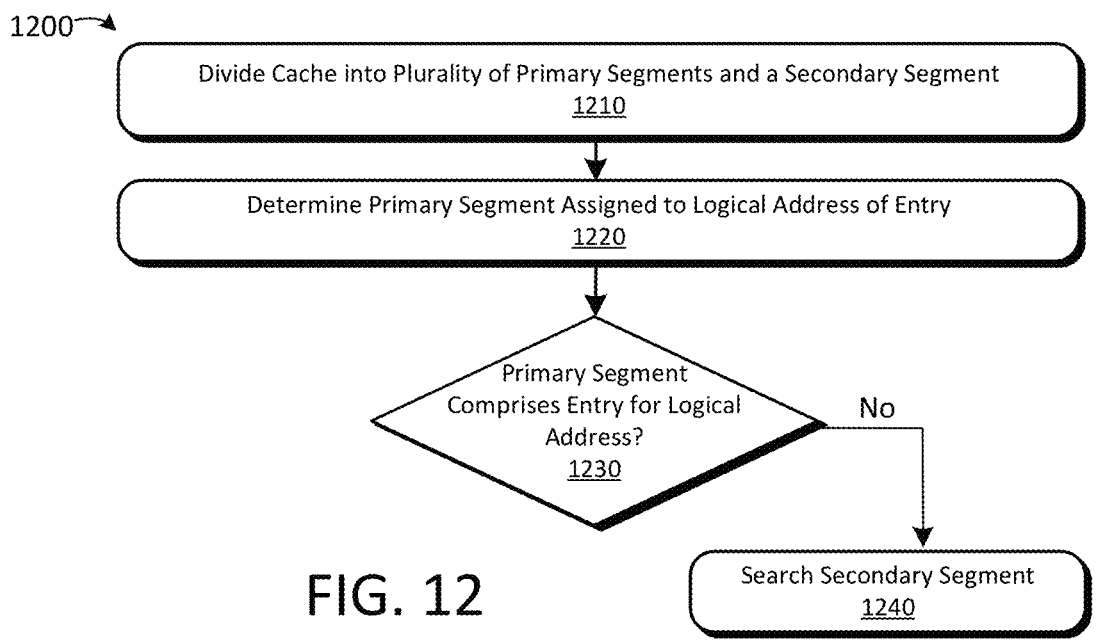
FIG. 12 depicts aspects of an example method for flushing cached logical-physical translation metadata by an NVM controller, such as the NVM controller illustrated in FIG. 2.

FIG. 12 depicts further aspects of an example method 1200 for retrieving logical-physical translation metadata from a cache 260 (e.g., in response to a request for an entry 252 of a specified logical address, as disclosed herein) by an NVM controller, such as the NVM controller 126 illustrated in FIG. 2. Method 1200 may be implemented by aspects of the translation layer 140 and/or cache manager 160, as disclosed herein. Step 1210 may comprise dividing the cache 260 into a plurality of segments 264, including a plurality of primary segments 264A-M and a secondary segment 264N. Step 1210 may further comprise caching logical-physical translation metadata (e.g., entries 252) within respective segments 264 of the cache 260 (e.g., in response to translation operations, cache misses, and/or the like). Step 1220 may comprise determining one of the plurality of primary segments 264A-M assigned to the specified logical address, as disclosed herein. Step 1230 may comprise retrieving an entry 252 for the specified logical from the determined one of the plurality of primary segments 264A-M, which may comprise determining whether the determined one of the plurality of primary segments 264A-M comprises a matching entry 252. Step 1230 may comprise causing the search engine 362 to perform an unmasked search within the determined one of the plurality of primary segments 264A-M (e.g., populating the pattern buffer 662 such that the target logical address 633 of the search criteria is the specified logical address and the mask 665 is configured such that none of the regions 802 thereof are disabled). Step 1230 may comprise searching a plurality of entries 252 in parallel (or at least partially in parallel) by use of, inter alia, a plurality of match components 664 (e.g., match components 664A-L corresponding to respective cache blocks 262A-L). Step 1240 may comprise searching the secondary segment 264N for an entry 252 matching the specified logical address in response to a cache miss at step 1230 (in an unmasked search operation). Alternatively, the method 1200 may comprise configuring the search engine 362 to search the determined one of the plurality of primary segments 264A-M and the secondary segment 264N in parallel (or at least partially in parallel), as disclosed herein.

Figure 13:
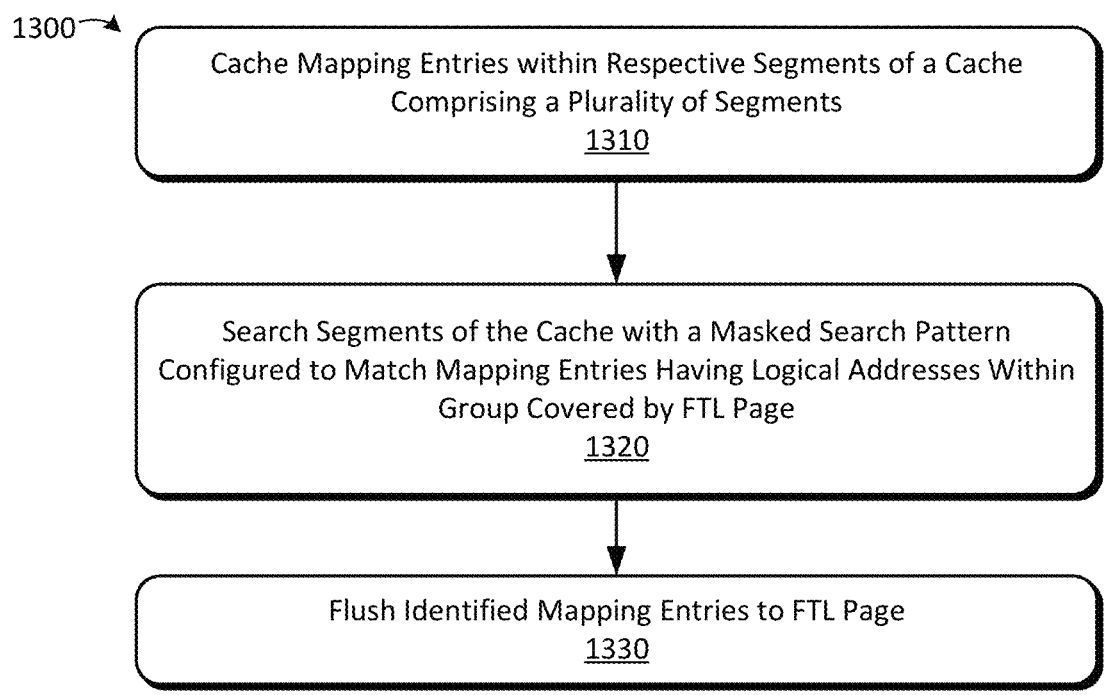
FIG. 13 depicts further aspects of another example method for flushing cached logical-physical translation metadata by an NVM controller, such as the NVM controller illustrated in FIG. 2.

FIG. 13 depicts aspects of an example method 1300 for implementing flush operations pertaining to logical-physical translation metadata maintained in a cache 260 by an NVM controller, such as the NVM controller 126 illustrated in FIG. 2. Method 1300 may be implemented by aspects of the translation layer 140 and/or cache manager 160, as disclosed herein. Step 1310 may comprise caching logical-physical translation metadata (e.g., mapping entries 252) within respective segments 264 of a cache 260 comprising a plurality of segments 264, as disclosed herein. Step 1320 may comprise logical-physical translation metadata to persistent storage. Step 1320 may be implemented in response to selection of an FTL page 254 for a flush and/or update operation (e.g., based on a dirty map 460 and/or other criteria). Step 1320 may comprise identifying entries 252 pertaining to the selected FTL page 254 (e.g., entries 252 within the group of logical addresses covered by the selected FTL page 254). Step 1320 may comprise searching segments 264 of the cache 260 with a masked search pattern (masked target logical address) configured to match entries 252 having logical addresses within the group of logical addresses covered by the selected FTL page 254. Step 1320 may comprise configuring the search engine 362 to implement masked search operations in respective segment 264, which may comprise populating a pattern buffer 662 with a target logical address 663 selected from the group of logical addresses and setting a mask 665 to disable one or more regions 802 of the target logical address 633 (produce a masked target logical address). The mask 665 may be configured to mask logical address regions 802 that vary between logical addresses of the group of logical addresses covered by the FTL page 254. The FTL page 254 may cover a logical address extent and the mask 655 may be configured to disable regions 802 corresponding to low-order bits covering the extent (e.g., 10 low-order bits for cover an extent comprising 1024 logical addresses). Step 1330 may comprise flushing the identified entries 252 to the FTL page 254. Step 1330 may comprise writing the updated entries 252 to persistent storage. Alternatively, step 1330 may comprise loading the FTL page 254, updating the FTL page 254 with the identified entries 252, and writing the updated FTL page 254 back to persistent storage, as disclosed herein.

System-on-Chip

Figure 14:
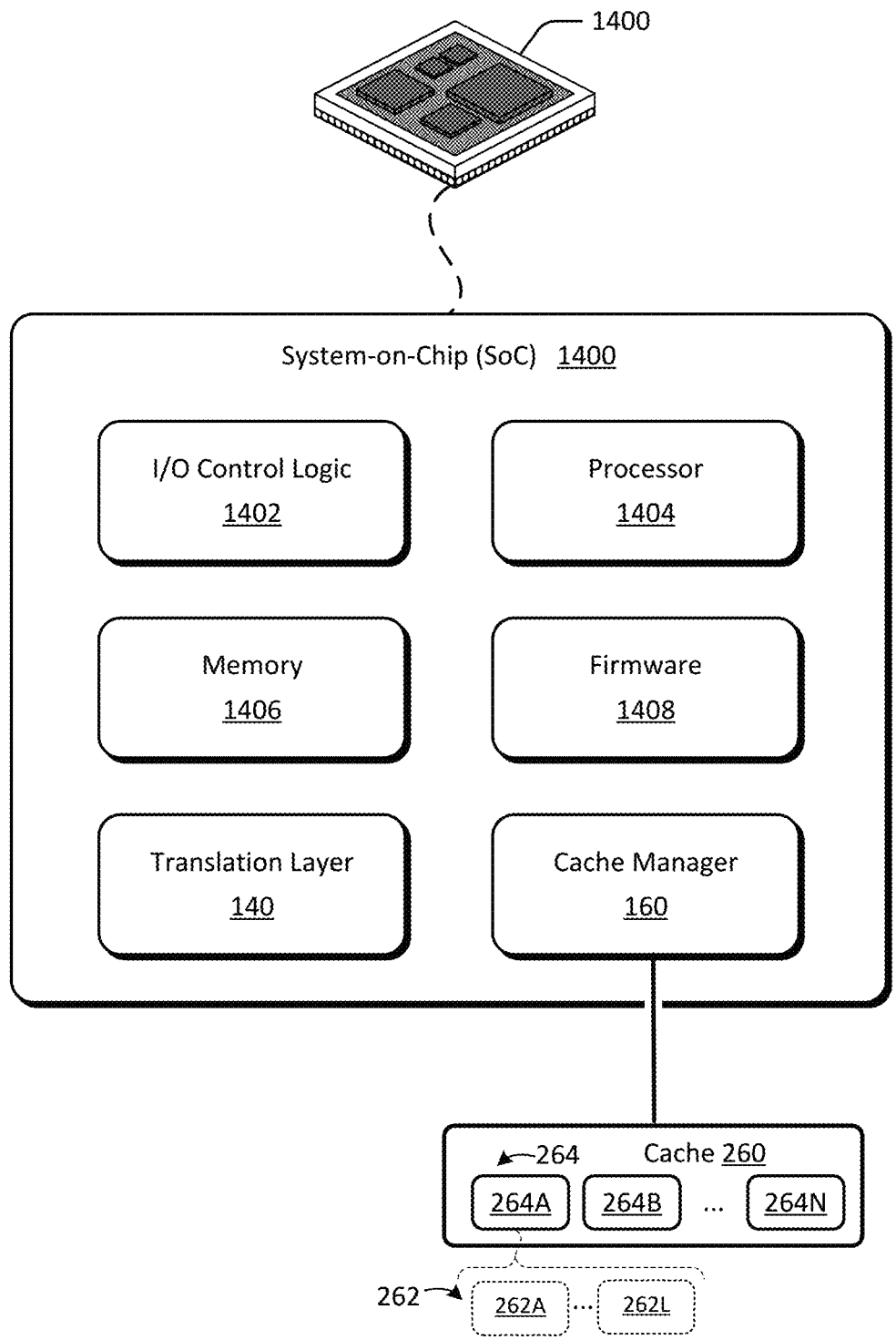
FIG. 14 illustrates an example System-on-Chip (SoC) environment in which aspects of the disclosed techniques for managing logical-physical translation metadata of an NVM system, such as the NVM system illustrated in FIG. 1, may be implemented.

FIG. 14 illustrates an example SoC 1400 that may implement various aspects for managing logical-physical translation metadata by an NVM system, such as the NVM system 114 illustrated in FIG. 1. The SoC 1400 may be implemented in any suitable system or device, such as a smart-phone, netbook, tablet computer, access point, network-attached storage, camera, smart appliance, printer, set-top box, server, data center, solid-state drive (SSD), hard disk drive (HDD), storage drive array, memory module, automotive computing system, or any other suitable type of device (e.g., others described herein). Although described with reference to a SoC, the entities of FIG. 14 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 1400 may be integrated with electronic circuitry, a microprocessor, memory, input-output (I/O) control logic, communication interfaces, firmware, and/or software useful to provide functionalities of a computing device, host system, or storage system, such as any of the devices or components described herein (e.g., storage drive or storage array). The SoC 1400 may also include an integrated data bus or interconnect fabric (not shown) that couples the various components of the SoC for control signaling, data communication, and/or routing between the components. The integrated data bus, interconnect fabric, or other components of the SoC 1400 may be exposed or accessed through an external port, parallel data interface, serial data interface, fabric-based interface, peripheral component interface, or any other suitable data interface. For example, the components of the SoC 1400 may access or control external storage media through an external interface or off-chip data interface.

In this example, the SoC 1400 includes various components such as input-output (I/O) control logic 1402 and a hardware-based processor 1404 (processor 1404), such as a microprocessor, processor core, application processor, DSP, or the like. The SoC 1400 also includes memory 1406, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1404 and code stored on the memory 1406 are implemented as a storage system controller or storage aggregator to provide various functionalities associated with the management and/or caching of logical-physical translation metadata, as disclosed herein. In the context of this disclosure, the memory 1406 stores data, code, instructions, or other information via non-transitory signals, and does not include carrier waves or transitory signals. Alternatively or additionally, SoC 1400 may comprise a data interface (not shown) for accessing additional or expandable off-chip storage media, such as solid-state memory (e.g., Flash or NAND memory), magnetic-based memory media, or optical-based memory media.

The SoC 1400 may also include firmware 1408, applications, programs, software, and/or operating system, which may be embodied as processor-executable instructions maintained on the memory 1406 for execution by the processor 1404 to implement functionalities of the SoC 1400. The SoC 1400 may also include other communication interfaces, such as a transceiver interface for controlling or communicating with components of a local on-chip (not shown) or off-chip communication transceiver. Alternatively or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 1400. For example, the SoC 1400 may include a transceiver interface configured to enable storage over a wired or wireless network, such as to provide a network attached storage (NAS) volume capable of efficiently caching logical-physical translation metadata, as disclosed herein.

The SoC 1400 may further comprise a translation layer 140 configured to, inter alia, process host I/Os 316 (and/or logical I/Os 416), implement logical-physical translation operations, maintain FTL metadata 150 in persistent storage (e.g., within NVM media 124), as disclosed herein. The translation layer 140 may comprise and/or be coupled to a cache manager 160, which may be configured to maintain portions of the logical-physical metadata within a cache 260 (maintain entries 252 comprising translations and/or mappings for respective logical addresses). The cache 260 may comprise and/or be implemented by memory resources of the SoC 1400 (e.g., may comprise and/or be implemented by the memory 1406). The cache manager 160 may be configured to divide the cache 260 into a plurality of segments 264 (e.g., primary segments 264A-M and a secondary segment 264N). The cache manager 160 may be further configured to index the segments 264 by logical address (in accordance with a cache distribution scheme). The cache manager 160 may determine segment assignments by use of an indexer 364 in accordance with a hash indexing scheme, as disclosed herein. The cache manager 160 may further comprise and/or be coupled to a search engine 362 configured to, inter alia, implement search operations within respective segments 264 of the cache 260, the search operations comprising unmasked search operations to identify entries 252 pertaining to specified logical addresses and masked search operations to identify entries 252 pertaining to groups of logical addresses (e.g., entries 252 covered by respective portions of the FTL metadata 150, such as respective FTL pages 254). The cache manager 160 may be configured to implement efficient flush operations, which may comprise configuring the search engine 362 to identify entries 252 covered by an FTL page 254 within the cache 260 (in one or more masked search operations) and writing the identified entries 252 to persistent storage (e.g., updating the FTL page 254).

Any of the entities comprising of the SoC 1400 (e.g., the translation layer 140 and/or cache manager 160) may be embodied as disparate or combined components, as described with reference to various aspects presented herein. Examples of these components and/or entities, or corresponding functionality, are described with reference to the respective components or entities of the example operating environment 100 of FIG. 1, respective configurations illustrated in FIGS. 2-8, and/or methods illustrated in FIGS. 9-13. The translation layer 140 and/or cache manager 160, either in whole or part, may be implemented as processor-executable instructions maintained by the memory 1406 and executed by the processor 1404 to implement various aspects and/or features disclosed herein.

The translation layer 140 and/or cache manager 160, may be implemented independently or in combination with any suitable component or circuitry to implement aspects described herein. For example, the translation layer 140 and/or cache manager 160 may be implemented as part of a DSP, processor/storage bridge, I/O bridge, graphics processing unit, memory controller, storage controller, arithmetic logic unit (ALU), or the like. The translation layer 140 and/or cache manager 160 may also be provided integral with other entities of SoC 1400, such as integrated with the processor 1404, memory 1406, a storage media interface, or firmware 1408 of the SoC 1400. Alternatively or additionally, the translation layer 140, cache manager 160, and/or other components of the SoC 1400 may be implemented as hardware, firmware, fixed logic circuitry, or any combination thereof.

Figure 15:
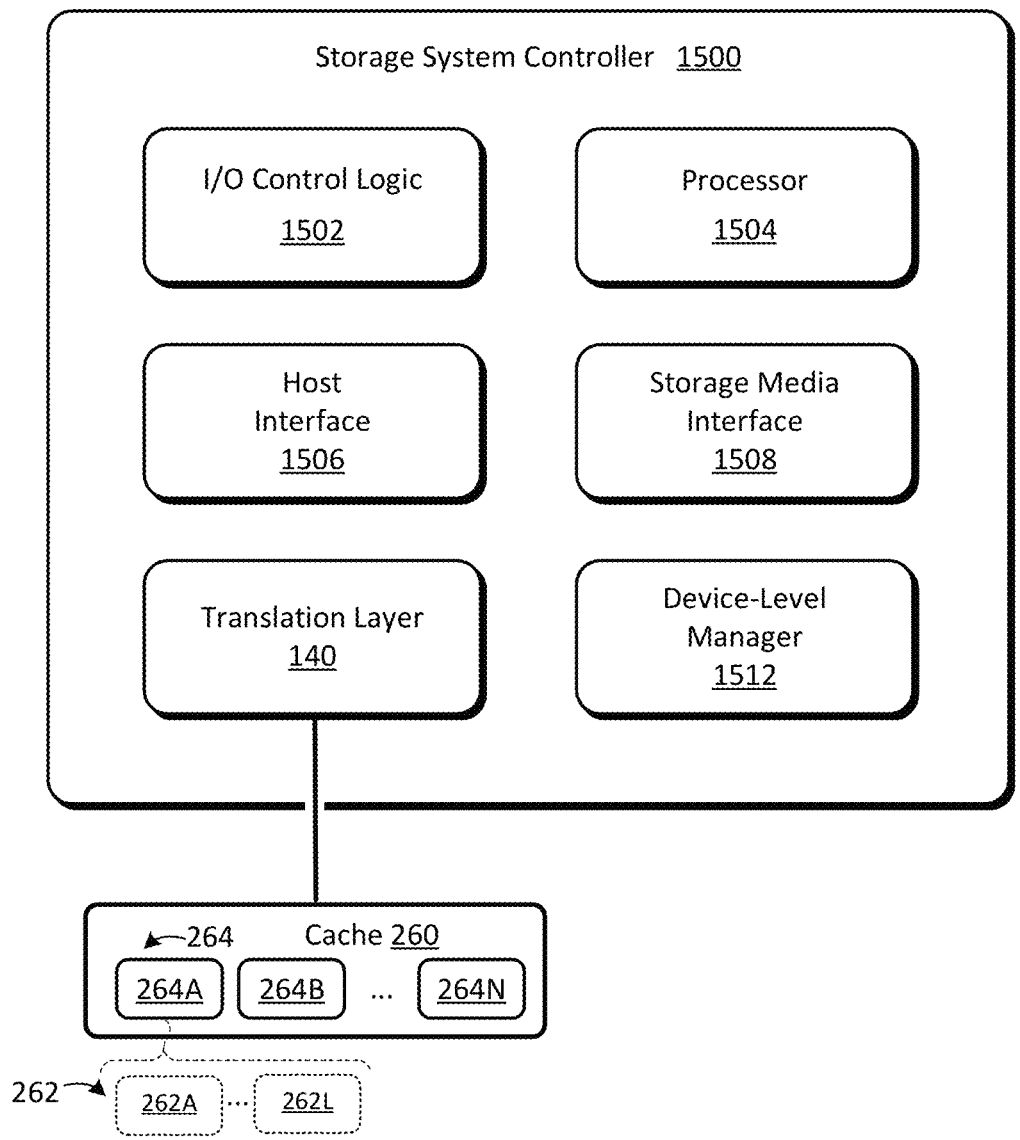
FIG. 15 illustrates an example storage system controller, such as the NVM controller illustrated in FIG. 2, in which a translation layer and cache manager are implemented in accordance with one or more aspects of the disclosure.

As another example, consider FIG. 15 which illustrates an example storage system controller 1500 in accordance with one or more aspects of an NVM controller, such as the NVM controller 126 illustrated in FIG. 2. In various aspects, the storage system controller 1500 or any combination of components thereof may be implemented as a storage drive controller, storage media controller, NAS controller, Fabric interface, NVMe target, or storage aggregation controller for solid-state storage media or other types of storage media. In some cases, the storage system controller 1500 is implemented similarly to or with components of the SoC 1400 as described with reference to FIG. 14. In other words, an instance of the SoC 1400 may be configured as a storage system controller, such as the storage system controller 1500 to manage solid-state (e.g., NAND Flash-based) media.

In this example, the storage system controller 1500 includes input-output (I/O) control logic 1502 and a processor 1504, such as a microprocessor, processor core, application processor, DSP, or the like. In some aspects, the processor 1504 and firmware of the storage system controller 1500 may be implemented to provide various functionalities associated with management of logical-physical translation metadata, such as those described with reference to any of methods 900 through 1300. The storage system controller 1500 also includes a host interface 1506 (e.g., SATA, PCIe, NVMe, or Fabric interface) and a storage media interface 1508 (e.g., NAND interface), which enable access to a host system and storage media, respectively. The storage system controller 1500 also includes a translation layer 140, cache manager 160, device-level manager 1512, and I/O scheduler (not shown). In some aspects, the translation layer 140 processes commands received via the host interface 1506 to manage data movement within or through the storage system controller 1500 (e.g., translate logical addresses of the commands to physical addresses, records logical-physical translations, and/.or the like, as disclosed herein).

The storage system controller 1500 also includes instances of a cache manager 160 and cache 260. Any or all of these components may be implemented separately as shown or combined with the processor 1504, host interface 1506, storage media interface 1508, translation layer 140, device-level manager 1512, and/or I/O scheduler. Examples of these components and/or entities, or corresponding functionality, are described with reference to the respective components or entities of the environment 100 of FIG. 1 or respective configurations illustrated in FIG. 2-8. In accordance with various aspects, the translation layer 140 may interact with the cache manager 160 to implement translation operations, as disclosed herein. The cache manager 160 may be configured to admit entries 252 into respective segments 264 of the cache 260, retrieve entries 252 from the cache, update entries 252 stored within the cache 260, flush entries from the cache 260, and so on, as disclosed herein.

Although the subject matter has been described in language specific to structural features and/or methodological operations, it is to be understood that the subject matter defined in the appended claims is not necessarily limited to the specific examples, features, or operations described herein, including orders in which they are performed.

We claim:

1. A method for managing logical-physical translation metadata, comprising:
deriving respective hash values from logical addresses of mapping entries configured to associate the logical addresses with physical addresses of a non-volatile memory system;
assigning the mapping entries to respective segments of a cache comprising a plurality of segments based on the respective hash values derived from the logical addresses of the mapping entries, the hash values configured to implement a logical address distribution scheme for balancing distribution of the mapping entries between the respective segments of the cache;
caching the mapping entries configured to associate logical addresses with physical addresses to the respective segments of the cache in accordance with the logical address distribution scheme; and
flushing mapping entries corresponding to a group of logical addresses from the cache to persistent storage of the memory system, the flushing comprising:
searching one or more of the plurality of segments of the cache with a masked search pattern configured to match mapping entries having logical addresses within the group of logical addresses, and
storing mapping entries determined to match the masked search pattern to the persistent storage.

2. The method of claim 1, wherein the logical address distribution based on the respective hash values is a first logical address distribution scheme and the group of logical addresses by which the mapping entries are flushed from the cache to the persistent storage are distributed in accordance with a second logical address distribution scheme different from the first logical address distribution scheme.

3. The method of claim 1, wherein searching a segment of the cache with the masked search pattern comprises:

populating a pattern buffer of a search engine with a logical address of the group; and
configuring the search engine to ignore logical address comparisons corresponding to a designated region of the pattern buffer.

4. The method of claim 1, wherein the group of logical addresses comprises a contiguous range of logical addresses, and wherein searching the segments of the cache with the masked search pattern comprises:
setting a target logical address of a search engine to a logical address within the contiguous range; and
configuring the search engine to mask low-order bits of the target logical address.

5. The method of claim 1, wherein searching a segment of the cache with the masked search pattern comprises comparing the masked search pattern to logical addresses of each of a plurality of mapping entries cached within the segment at least partially in parallel.

6. The method of claim 1, further comprising admitting mapping entries into the cache, wherein admitting a mapping entry comprises:
retrieving the mapping entry from persistent storage;
assigning the mapping entry to a segment of the cache based on a logical address of the mapping entry; and
caching the mapping entry within one of the determined segments and an overflow segment of the cache.

7. The method of claim 6, further comprising retrieving mapping entries from the cache, wherein retrieving a mapping entry corresponding to a specified logical address from the cache comprises:
determining a segment of the cache assigned to the specified logical address based on a digest of the specified logical address; and
searching one or more of the determined segment of the cache and the overflow segment of the cache for a mapping entry matching the specified logical address.

8. A System-on-Chip (SoC), comprising:
a host interface to communicate with a host system;
a cache comprising a plurality of segments, each segment configured to store entries of a logical-physical translation layer pertaining to a non-volatile memory (NVM) medium;
an indexer configured to assign the entries to respective ones of the plurality segments of the cache based on respective hash values of logical addresses of the entries, the respective hash values configured to balance distribution of the entries between respective segments of the cache;
a search engine to identify entries cached within respective segments of the cache that match criteria comprising a search pattern and mask, the mask configured to selectively disable specified regions of the search pattern;
a hardware-based processor; and
a memory storing processor-executable instructions that, responsive to execution by the hardware-based processor, implement a cache manager configured to:
select an extent of logical addresses to update on persistent storage in a flush operation,
cause the search engine to search respective segments of the cache for entries matching first criteria in response to selecting the extent, the search pattern of the first criteria comprising a logical address within the extent of logical addresses and the mask of the first criteria configured to disable at least one region of the search pattern, and write entries determined to match the second search criteria to the persistent storage.

9. The SoC of claim 8, wherein to admit an entry pertaining to a designated logical address into the cache, the cache manager is further configured to:
   determine a segment of the cache assigned to the designated logical address based on a hash value of the logical address of the entry, and
   cache the entry within one of the determined segment of the cache and a secondary segment of the cache.

10. The SoC of claim 8, wherein to retrieve the entry pertaining to the designated logical address from the cache, the cache manager is further configured to:
   determine the segment of the cache assigned to the designated logical address, and
   cause the search engine to search one or more of the determined segment of the cache and the secondary segment of the cache for an entry matching second criteria, the search pattern of the second criteria comprising the designated logical address and the mask of the second criteria configured such that none of the regions of the search pattern are disabled.

11. The SoC of claim 10, wherein the cache manager is configured to cause the search engine to search the determined segment of the cache and the secondary segment of the cache at least partially in parallel.

12. The SoC of claim 8, wherein the indexer is further configured to derive the hash values of the respective logical addresses of the entries of the logical-physical translation layer.

13. The SoC of claim 8, wherein the indexer implements a first logical address distribution scheme by using the respective hash values of the logical address to balance distribution of the entries between respective segments of the cache and the cache manager implements a second logical address distribution scheme to the write entries determined to match the second search criteria to the persistent storage.

14. An apparatus comprising:
   hardware-based storage media comprising persistent storage and a cache organized into a plurality of segments for storing mapping entries configured to associate logical addresses with physical addresses of a non-volatile memory system;
   an indexer configured to:
      derive respective hash values from logical addresses of the mapping entries;
      assign the mapping entries to respective segments of the cache based on the respective hash values derived from the logical addresses of the mapping entries, the hash values configured to implement a logical address distribution scheme for balancing distribution of the mapping entries between the respective segments of the cache; and
      cache the mapping entries to the respective segments of the cache in accordance with the logical address distribution scheme; and
   a cache manager configured to flush mapping entries corresponding to a group of logical addresses from the cache to persistent storage by:
      searching one or more of the plurality of segments of the cache with a masked search pattern configured to match mapping entries having logical addresses within the group of logical addresses, and
      storing mapping entries determined to match the masked search pattern to the persistent storage.

15. The apparatus of claim 14, wherein the logical address distribution based on the respective hash values is a first logical address distribution scheme and the cache manager implements a second logical address scheme to flush the mapping entries that correspond to the group of logical addresses from the cache to the persistent storage, the second logical address distribution scheme different from the first logical address distribution scheme.

16. The apparatus of claim 14, wherein the cache manager is further configured to search a segment of the cache with the masked search pattern by:
   populating a pattern buffer of a search engine with a logical address of the group; and
   configuring the search engine to ignore logical address comparisons corresponding to a designated region of the pattern buffer.

17. The apparatus of claim 14, wherein the group of logical addresses comprises a contiguous range of logical addresses, and the cache manager is further configured to search the segments of the cache with the masked search pattern by:
   setting a target logical address of a search engine to a logical address within the contiguous range; and
   configuring the search engine to mask low-order bits of the target logical address.

18. The apparatus of claim 14, wherein the cache manager is further configured to search a segment of the cache with the masked search pattern by:
   comparing the masked search pattern to logical addresses of each of a plurality of mapping entries cached within the segment at least partially in parallel.

19. The apparatus of claim 14, wherein the indexer is further configured to admit mapping entries into the cache by:
   retrieving the mapping entry from persistent storage;
   assigning the mapping entry to a segment of the cache based on a logical address of the mapping entry; and
   caching the mapping entry within one of the determined segments and an overflow segment of the cache.

20. The apparatus of claim 14, wherein the cache manager is configured to retrieve a mapping entry corresponding to a specified logical address from the cache by:
   determining a segment of the cache assigned to the specified logical address based on a digest of the specified logical address; and
   searching one or more of the determined segment of the cache and the overflow segment of the cache for a mapping entry matching the specified logical address.

* * * * *